United States Patent
Kuo et al.

(10) Patent No.: US 7,582,711 B2
(45) Date of Patent: Sep. 1, 2009

(54) ZIEGLER-TYPE CATALYSTS HAVING INCREASED PRODUCTIVITY

(75) Inventors: Chi-I Kuo, Humble, TX (US); Steven K. Ackerman, Baytown, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 11/885,522

(22) PCT Filed: Feb. 21, 2006

(86) PCT No.: PCT/US2006/006040

§ 371 (c)(1),
(2), (4) Date: Aug. 31, 2007

(87) PCT Pub. No.: WO2006/096319

PCT Pub. Date: Sep. 14, 2006

(65) Prior Publication Data

US 2008/0194780 A1   Aug. 14, 2008

Related U.S. Application Data

(60) Provisional application No. 60/658,707, filed on Mar. 4, 2005.

(51) Int. Cl.
C08F 4/612 (2006.01)
B01J 31/12 (2006.01)

(52) U.S. Cl. ............ 526/113; 526/118; 526/160; 526/943; 526/124.3; 526/352; 502/103; 502/152; 502/154

(58) Field of Classification Search ............ 526/113, 526/118, 160, 943, 124.3, 352; 502/103, 502/152, 154
See application file for complete search history.

(56) References Cited

U.S. PATENT DOCUMENTS

| | | | |
|---|---|---|---|
| 5,032,562 A | 7/1991 | Lo et al. | 502/111 |
| 5,183,867 A | 2/1993 | Welborn, Jr. | 526/114 |
| 5,525,678 A | 6/1996 | Mink et al. | 525/246 |
| 5,539,076 A | 7/1996 | Nowlin et al. | 526/348.1 |
| 5,550,094 A | 8/1996 | Ali et al. | 502/115 |
| 5,693,583 A | 12/1997 | Hagerty et al. | 502/115 |
| 5,882,750 A | 3/1999 | Mink et al. | 428/35.7 |
| 6,194,520 B1 | 2/2001 | Cheruvu et al. | 525/240 |
| 6,492,473 B1 | 12/2002 | Canich et al. | 526/117 |
| 6,828,395 B1 | 12/2004 | Ehrman et al. | 526/114 |
| 2004/0043893 A1 | 3/2004 | Laughlin | 502/117 |
| 2004/0044153 A1 * | 3/2004 | Ehrman et al. | 526/113 |

FOREIGN PATENT DOCUMENTS

| | | |
|---|---|---|
| EP | 0 746 574 | 4/2005 |
| WO | WO 02/44222 | 6/2002 |
| WO | WO 02/44222 A1 * | 6/2002 |
| WO | WO 03/048213 | 6/2003 |

* cited by examiner

*Primary Examiner*—Ling-Siu Choi
(74) *Attorney, Agent, or Firm*—Kevin M. Faulkner; Leandro Arechederra, III

(57) ABSTRACT

The present invention relates to catalyst systems for polyolefin production, and more particularly, to catalyst systems for polyolefins used in producing films.

7 Claims, No Drawings

US 7,582,711 B2

ZIEGLER-TYPE CATALYSTS HAVING INCREASED PRODUCTIVITY

This application is a National Stage entry under 36 U.S.C. 371 of International Application No. PCT/US2006/006040, filed Feb. 21, 2006, and claims the benefit of Ser. No. 60/658,707, filed Mar. 4, 2005, the disclosure of which is incorporated by reference.

FIELD OF INVENTION

The present invention relates to catalysts for polyolefin production, and more particularly, to catalysts for polyolefins used in producing films, wherein the polyolefin is produced in a single reactor using a catalyst in a desirable embodiment.

BACKGROUND

Advances in polymerization and catalysis have resulted in the ability to produce many new polymers having improved physical and chemical properties useful in a wide variety of superior products and applications. With the development of new catalysts, the choice of polymerization (solution, slurry, high pressure or gas phase) for producing a particular polymer have been greatly expanded. Also, advances in polymerization technology have provided more efficient, highly productive and economically enhanced processes.

As with any new technology field, particularly in the polyolefins industry, a small savings in cost often determines whether a commercial endeavor is even feasible. The industry has been extremely focused on developing new and improved catalyst systems. Some have focused on designing the catalyst systems to produce new polymers, others on improved operability, and many more on improving catalyst productivity. The productivity of a catalyst, that is, the amount of polymer produced per gram of the catalyst, usually is the key economic factor that can make or break a new commercial development in the polyolefin industry.

Ziegler-Natta catalyst systems are utilized extensively in commercial processes that produce high density and low-density polyethylenes in a variety of molecular weights. Production rates in certain gas phase reactors may be limited in their ability to discharge from the reactor the polymer particles that are produced during the reaction. In certain of such cases, an increase in the bulk density of the polymer particles may increase the production rate of the reactor. Generally, Ziegler-Natta catalysts that have increasing activity and productivity, and that are used in gas phase operations. may tend to produce polymer products that have decreasing bulk density. If a reactor is limited in its ability to discharge the polymer product, the use of a high activity catalyst may result in a decrease in the bulk density of the polymer product.

Bimodal polymers produced using two or more different catalyst types—bimetallic catalysts—are of increasing interest, especially in producing polyethylene and other polyolefins. Improving catalyst productivity also is of concern here, as productivity should be as high as possible in order to optimize the economic efficiency of the process, given the significant cost of bimetallic catalysts.

Background references include U.S. Pat. Nos. 5,693,583; 5,550,094; 5,032,562; 5,882,750; 5,539,076; 6,194,520; and EP 0746574.

SUMMARY OF THE INVENTION

In an embodiment, the invention provides for a process for producing a bimodal polyolefin composition comprising: contacting hydrogen and ethylene monomers with a supported, activated bimetallic catalyst composition to form a bimodal polyolefin composition; wherein the supported, activated bimetallic catalyst composition comprises:
  (a) a support material;
  (b) an activator that comprises aluminum;
  (c) a nonmetallocene catalyst component; and
  (d) a metallocene catalyst compound comprising a metal atom "M";
wherein the ratio of aluminum to metal atom "M" is in the range of from 50:1 to 80:1.

In another embodiment, the invention provides for a process of producing a bimodal polyolefin composition, comprising:
  (a) providing a dehydrated support material;
  (b) providing a support slurry by contacting the dehydrated support material with an organomagnesium compound at a rate such that no more than 0.024 mmole magnesium is contacted with each gram of dehydrated support material per minute;
  (c) providing a nonmetallocene catalyst component that includes a non-metallocene catalyst;
  (d) providing a metallocene catalyst component that includes a metallocene catalyst compound;
  (e) combining the support slurry with the nonmetallocene and metallocene catalyst components to form a supported bimetallic catalyst composition; and
  (f) contacting monomers with the bimetallic catalyst composition for a time sufficient to form a bimodal polyolefin composition.

In yet another embodiment, the invention provides for a supported, activated bimetallic catalyst composition comprising a support material, an activator that comprises aluminum, a non-metallocene catalyst component, and a metallocene catalyst component comprising a metal atom "M," wherein the ratio of aluminum to metal atom "M" is in the range of from 50:1 to 80:1.

In an embodiment, the invention provides for a supported bimetallic catalyst composition that is the product of a process comprising:
  providing a dehydrated support material;
  providing a support slurry by contacting the dehydrated support material with an organomagnesium compound at a rate such that no more than 0.024 mmole magnesium is contacted with each gram of support material per minute;
  providing a nonmetallocene catalyst component that includes a non-metallocene catalyst;
  providing a metallocene catalyst component that includes a metallocene catalyst compound; and
  combining the support slurry with the nonmetallocene and metallocene catalyst components to form a supported bimetallic catalyst composition.

In another embodiment, the invention provides for a process for making polyolefins, comprising
  providing a silica support material;
  providing a support slurry by contacting the at least one silica support material with an organomagnesium compound at a rate such that no more than 0.024 mmole magnesium is contacted with each gram of silica support material per minute;
  combining the support slurry with at least one titanium compound to provide a supported catalyst system; and
  contacting, in a reactor, ethylene and at least one comonomer selected from the group consisting of C3 to C8 alpha olefin in the presence of the supported catalyst system.

In yet another embodiment, the invention provides for a supported catalyst system that is the product of a process comprising providing a silica support material;

providing a support slurry by contacting the at least one silica support material with an organomagnesium compound at a rate such that no more than 0.024 mmole magnesium is contacted with each gram of support material per minute; and combining the support slurry with at least one titanium compound to provide a supported catalyst system.

DETAILED DESCRIPTION

General Definitions

As used herein, in reference to Periodic Table "Groups" of Elements, the "new" numbering scheme for the Periodic Table Groups are used as in the CRC HANDBOOK OF CHEMISTRY AND PHYSICS (David R. Lide ed., CRC Press 81$^{st}$ ed. 2000).

As used herein, the phrase "catalyst system" includes at least one "catalyst component" and at least one "activator", both of which are described further herein. The catalyst system also may include other components, such as supports, etc., and is not limited to the catalyst component and/or activator alone or in combination. The catalyst system may include any number of catalyst components in any combination as described herein, as well as any activator in any combination as described herein.

As used herein, the phrase "catalyst compound" includes any compound that, once appropriately activated, is capable of catalyzing the polymerization or oligomerization of olefins, the catalyst compound comprising at least one Group 3 to Group 12 atom, and optionally at least one leaving group bound thereto.

As used herein, the phrase "leaving group" refers to one or more chemical moieties bound to the metal center of the catalyst component that can be abstracted from the catalyst component by an activator, thus producing the species active towards olefin polymerization or oligomerization. The activator is described further below.

As used herein, the term "substituted" means that the group following that term possesses at least one moiety in place of one or more hydrogens in any position, the moieties selected from such groups as halogen radicals (esp., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

As used herein, structural formulas are employed as is commonly understood in the chemical arts; lines ("—") used to represent associations between a metal atom ("M", Group 3 to Group 12 atoms) and a ligand or ligand atom (e.g., cyclopentadienyl, nitrogen, oxygen, halogen ions, alkyl, etc.), as well as the phrases "associated with", "bonded to" and "bonding", are not limited to representing a certain type of chemical bond, as these lines and phrases are meant to represent a "chemical bond"; a "chemical bond" defined as an attractive force between atoms that is strong enough to permit the combined aggregate to function as a unit, or "compound".

A certain stereochemistry for a given structure or part of a structure should not be implied unless so stated for a given structure or apparent by use of commonly used bonding symbols such as by dashed lines and/or heavy lines.

Unless stated otherwise, no embodiment of the present invention is herein limited to the oxidation state of the metal atom "M" as defined below in the individual descriptions and examples that follow. The ligation of the metal atom "M" is such that the compounds described herein are neutral, unless otherwise indicated.

As used herein, the term "bimodal," when used to describe a polymer or polymer composition (e.g., polyolefins such as polyethylene, or other homopolymers, copolymers or terpolymers) means "bimodal molecular weight distribution," which is understood as having the broadest definition persons in the pertinent art have given that term as reflected in printed publications and issued patents. For example, a single composition that includes polyolefins with at least one identifiable high molecular weight distribution and polyolefins with at least one identifiable low molecular weight distribution is considered to be a "bimodal" polyolefin, as that term is used herein. In a particular embodiment, other than having different molecular weights, the high molecular weight polyolefin and the low molecular weight polyolefin may be essentially the same type of polymer, for example, polyethylene.

As used herein, the term "productivity" means the weight of polymer produced per weight of the catalyst used in the polymerization process (e.g., grams polymer/gram catalyst).

As used herein, the term "dehydrated" is understood as having the broadest definition persons in the pertinent art have given that term in describing catalyst support materials, for example, silica, as reflected in printed publications and issued patents, and includes any material, for example, a support particle, from which a majority of the contained/adsorbed water has been removed.

Catalyst Compounds of the Present Invention

According to one embodiment of the present invention, supported catalyst systems are provided that are the product of processes that include, inter alia, the addition of an organomagnesium compound to a support slurry in relatively slow fashion. Suitable organomagnesium compounds and suitable support materials are further discussed below.

In accordance with the present invention, the organomagnesium compound generally may be added to the support material relatively slowly. In certain embodiments of the present invention, the organomagnesium compound is added to the support material at a rate such that no more than 0.024 mmole magnesium is contacted with each gram of support material per minute (e.g., 0.024 mmole Mg/gram support material/minute); in certain other embodiments, the organomagnesium compound is added to the support material at a rate such that no more than 0.012 mmole magnesium is contacted with each gram of support material per minute (e.g., 0.012 mmole Mg/gram support material/minute). In certain embodiments of the present invention, wherein the dehydrated support material is present in an amount of at least 300 grams, the organomagnesium compound contacts the dehydrated support material over at least 30 minutes; in certain alternate embodiments wherein the dehydrated support material is present in an amount of 10 grams or less, the organomagnesium compound contacts the dehydrated support material over at least 5 minutes. Without intended to be limited by theory, it is contemplated that a more gradual addition of the organomagnesium compound to the support material may permit, inter alia, greater penetration of the organomagnesium compound into recesses (e.g., pores) within the support material. Among other benefits, this may result in a more homogeneous catalyst system, because, inter alia, the organomagnesium compound may be more evenly distributed throughout the support material.

In certain embodiments of the present invention, the supported catalyst systems may be, inter alia, unimodal catalyst systems that comprise nonmetallocene catalyst components. In certain embodiments of the present invention, the supported catalyst systems may be, inter alia, bimodal catalyst systems that comprise a nonmetallocene catalyst component and a metallocene catalyst component.

Unimodal Catalyst Systems

As noted above, the unimodal catalyst compositions of the present invention include a nonmetallocene catalyst component, which generally comprises a non-metallocene compound. In a particular embodiment, the nonmetallocene catalyst component is a Ziegler-Natta catalyst compound. Ziegler-Natta catalyst components are well known in the art and described by, for example, ZIEGLER CATALYSTS 363-386 (G. Fink, R. Mulhaupt and H. H. Brintzinger, eds., Springer-Verlag 1995). Examples of such catalysts include those comprising $TiCl_4$ and other such transition metal oxides and chlorides.

Generally, the nonmetallocene catalyst component is combined with a support material (examples of which are further described below). The nonmetallocene catalyst component can be combined with, placed on, or otherwise affixed to a support in a variety of ways. In one of those ways, a slurry of the support in a suitable non-polar hydrocarbon diluent may be contacted with an organomagnesium compound, which then dissolves in the non-polar hydrocarbon diluent of the slurry to form a solution from which the organomagnesium compound is then deposited onto the carrier. The organomagnesium compound can be represented by the formula RMgR', where R' and R are the same or different $C_2$-$C_{12}$ alkyl groups, or $C_4$-$C_{10}$ alkyl groups, or $C_4$-$C_8$ alkyl groups. In at least one specific embodiment, the organomagnesium compound is dibutyl magnesium.

In one embodiment, the amount of organomagnesium compound included in the silica slurry is only that which will be deposited, physically or chemically, onto the support, for example, being bound to the hydroxyl groups on the support, and no more than that amount, since any excess organomagnesium compound may cause undesirable side reactions. Routine experimentation can be used to determine the optimum amount of organomagnesium compound. For example, the organomagnesium compound can be added to the slurry while stirring the slurry, until the organomagnesium compound is detected in the support solvent. Alternatively, the organomagnesium compound can be added in excess of the amount that is deposited onto the support, in which case any undeposited excess amount can be removed by filtration and washing. The amount of organomagnesium compound (moles) based on the amount of dehydrated silica (grams) generally range from 0.2 mmol/g to 2 mmol/g in one embodiment.

As noted above, in accordance with the present invention, the organomagnesium compound generally may be added to the support material relatively slowly. In certain embodiments of the present invention, the organomagnesium compound is added to the support material at a rate such that no more than 0.024 mmole magnesium is contacted with each gram of support material per minute (e.g., 0.024 mmole Mg/gram support material/minute); in certain other embodiments, the organomagnesium compound is added to the support material at a rate such that no more than 0.012 mmole magnesium is contacted with each gram of support material per minute (e.g., 0.012 mmole Mg/gram support material/ minute). In certain embodiments of the present invention, wherein the dehydrated support material is present in an amount of at least 300 grams, the organomagnesium compound contacts the dehydrated support material over at least 30 minutes; in certain alternate embodiments wherein the dehydrated support material is present in an amount of 10 grams or less, the organomagnesium compound contacts the dehydrated support material over at least 5 minutes.

Optionally, the organomagnesium compound-treated slurry may be contacted with an electron donor, such as tetraethylorthosiloxane (TEOS) or an organic alcohol R"OH, where R" is a $C_1$-$C_{12}$ alkyl group, or a $C_1$ to $C_8$ alkyl group, or a $C_2$ to $C_4$ alkyl group. In a particular embodiment, R"OH may be n-butanol. The amount of organic alcohol used may be an amount effective to provide an R"OH:Mg mol/mol ratio of from 0.2 to 1.5, or from 0.4 to 1.2, or from 0.6 to 1.1, or from 0.9 to 1.1.

The slurry (which, as noted, optionally may be organomagnesium-treated and/or alcohol-treated) is contacted with a non-metallocene transition metal compound. Suitable non-metallocene transition metal compounds are compounds of Group 4 and 5 metals that are soluble in the non-polar hydrocarbon used to form the silica slurry. Suitable non-metallocene transition metal compounds include, for example, titanium and vanadium halides, oxyhalides or alkoxyhalides, such as titanium tetrachloride ($TiCl_4$), vanadium tetrachloride ($VCl_4$) and vanadium oxytrichloride ($VOCl_3$), and titanium and vanadium alkoxides, wherein the alkoxide moiety has a branched or unbranched alkyl group of 1 to 20 carbon atoms, preferably 1 to 6 carbon atoms. Mixtures of such transition metal compounds also may be used. The amount of non-metallocene transition metal compound used is sufficient to give a transition metal to magnesium mol/mol ratio of from 0.3 to 1.5, or from 0.5 to 0.8. The diluent can then be removed in a conventional manner, such as by evaporation or filtering, to obtain the dry, supported nonmetallocene catalyst component.

As noted above, the unimodal catalysts of the present invention further comprise a support material (e.g., a silica support material). Examples of suitable silica support materials are further described in greater detail below, in later portions of this application.

Bimodal Catalyst Systems

As noted above, certain embodiments of the present invention involve bimodal catalyst systems comprising a bimetallic catalyst. The bimetallic catalyst comprises an activator, a support material, a nonmetallocene component and a metallocene component. The bimetallic catalyst, each of its components, and examples of suitable activators and support materials are set forth further below.

In one aspect of the invention, a method of making bimodal polymers is characterized in that monomers are contacted with a bimetallic catalyst in a single reactor vessel and form a bimodal polyolefin composition in the same reactor vessel.

Bimetallic Catalyst

As used herein, the term "bimetallic catalyst" or "bimetallic catalyst system" refers to two or more catalyst components used in combination with at least one activator, and a support material, that is useful in polymerizing olefins. The "supported bimetallic catalyst" or "supported bimetallic catalyst composition" refers to the bimetallic catalyst system as used in combination with a support material, wherein one or more of the components that make up the bimetallic catalyst system may be bound to the support. In a particular embodiment, the bimetallic catalyst of the invention includes two catalyst components. In a more particular embodiment, the bimetallic catalyst component includes a "nonmetallocene catalyst component" and a "metallocene catalyst component".

As used herein, the term "non-metallocene compound" refers any catalyst that is neither a metallocene nor one of the metallocene-type catalyst compounds identified below. Examples of nonmetallocene catalyst compounds include, inter alia, titanium- or vanadium-based Ziegler-Natta catalysts compounds as described further herein.

Certain embodiments of the present invention involve contacting monomers with the bimetallic catalyst component. In a particular embodiment, each different catalyst compound that comprises the bimetallic catalyst resides, or is supported on a single type of support such that, on average, each particle of support material includes both the nonmetallocene and metallocene catalyst components. In another embodiment, the nonmetallocene catalyst component is supported separately from the metallocene catalyst component such that on average any given particle of support material comprises only the nonmetallocene or the metallocene catalyst component. In this later embodiment, each supported catalyst may be introduced into the polymerization reactor sequentially in any order, alternately in parts, or simultaneously.

In certain embodiments, a higher molecular weight resin (e.g., >ca 100,000 amu) can be produced from a titanium non-metallocene catalyst component. In certain embodiments, a lower molecular weight resin (e.g., <ca 100,000 amu) can be produced from a metallocene catalyst component. Accordingly, polymerization in the presence of the non-metallocene and metallocene catalyst components provides a bimodal polyolefin composition that includes a low molecular weight component and a high molecular weight component. The two catalyst components reside on a single support particle in a particular embodiment, and they can be affixed to the support in a variety of ways.

In one embodiment, an "enhanced silica" is prepared as described herein and constitutes the support; the non-metallocene catalyst compound is first combined with the enhanced silica, to provide a supported non-metallocene composition; the supported non-metallocene composition is combined with the metallocene catalyst component, resulting in a bimetallic catalyst composition having enhanced productivity when used in production of a bimodal polyolefin composition.

Various methods of affixing two different catalyst components (albeit a different combination of catalysts) to a support can be used. In general, one procedure for preparing a supported bimetallic catalyst can include providing a supported nonmetallocene catalyst component, contacting a slurry that includes the nonmetallocene catalyst component in a non-polar hydrocarbon with a solution that includes the metallocene catalyst component, which also may include an activator, drying the resulting product that includes the nonmetallocene and metallocene catalyst components, and recovering a bimetallic catalyst composition.

Nonmetallocene Catalyst Component

As noted above, the bimetallic catalyst compositions of the present invention includes a nonmetallocene catalyst component, which generally comprises a non-metallocene compound. In a particular embodiment, the nonmetallocene catalyst component is a Ziegler-Natta catalyst compound. Ziegler-Natta catalyst components are well known in the art and described by, for example, ZIEGLER CATALYSTS 363-386 (G. Fink, R. Mulhaupt and H. H. Brintzinger, eds., Springer-Verlag 1995). Examples of such catalysts include those comprising $TiCl_4$ and other such transition metal oxides and chlorides.

The nonmetallocene catalyst component is combined with a support material in one embodiment, either with or without the metallocene catalyst component. The nonmetallocene catalyst component can be combined with, placed on, or otherwise affixed to a support in a variety of ways. In one of those ways, a slurry of the support in a suitable non-polar hydrocarbon diluent may be contacted with an organomagnesium compound, which then dissolves in the non-polar hydrocarbon diluent of the slurry to form a solution from which the organomagnesium compound is then deposited onto the carrier. The organomagnesium compound can be represented by the formula RMgR', where R' and R are the same or different $C_2$-$C_{12}$ alkyl groups, or $C_4$-$C_{10}$ alkyl groups, or $C_4$-$C_8$ alkyl groups. In at least one specific embodiment, the organomagnesium compound is dibutyl magnesium.

In one embodiment, the amount of organomagnesium compound included in the silica slurry is only that which will be deposited, physically or chemically, onto the support, for example, being bound to the hydroxyl groups on the support, and no more than that amount, since any excess organomagnesium compound may cause undesirable side reactions. Routine experimentation can be used to determine the optimum amount of organomagnesium compound. For example, the organomagnesium compound can be added to the slurry while stirring the slurry, until the organomagnesium compound is detected in the support solvent. Alternatively, the organomagnesium compound can be added in excess of the amount that is deposited onto the support, in which case any undeposited excess amount can be removed by filtration and washing. The amount of organomagnesium compound (moles) based on the amount of dehydrated silica (grams) generally range from 0.2 mmol/g to 2 mmol/g in one embodiment.

As noted above, in accordance with the present invention, the organomagnesium compound generally may be added to the support material relatively slowly. In certain embodiments of the present invention, the organomagnesium compound is added to the support material at a rate such that no more than 0.024 mmole magnesium is contacted with each gram of support material per minute (e.g., 0.024 mmole Mg/gram support material/minute); in certain other embodiments, the organomagnesium compound is added to the support material at a rate such that no more than 0.012 mmole magnesium is contacted with each gram of support material per minute (e.g., 0.012 mmole Mg/gram support material/minute). In certain embodiments of the present invention, wherein the dehydrated support material is present in an amount of at least 300 grams, the organomagnesium compound contacts the dehydrated support material over at least 30 minutes; in certain alternate embodiments wherein the dehydrated support material is present in an amount of 10 grams or less, the organomagnesium compound contacts the dehydrated support material over at least 5 minutes.

Optionally, the organomagnesium compound-treated slurry may be contacted with an electron donor, such as tetraethylorthosiloxane (TEOS) or an organic alcohol R"OH, where R" is a $C_1$-$C_{12}$ alkyl group, or a $C_1$ to $C_8$ alkyl group, or a $C_2$ to $C_4$ alkyl group. In a particular embodiment, R"OH may be n-butanol. The amount of organic alcohol used may be an amount effective to provide an R"OH:Mg mol/mol ratio of from 0.2 to 1.5, or from 0.4 to 1.2, or from 0.6 to 1.1, or from 0.9 to 1.1.

The slurry (which, as noted, optionally may be organomagnesium-treated and/or alcohol-treated) is contacted with a non-metallocene transition metal compound. Suitable non-metallocene transition metal compounds are compounds of Group 4 and 5 metals that are soluble in the non-polar hydrocarbon used to form the silica slurry. Suitable non-metallocene transition metal compounds include, for example, titanium and vanadium halides, oxyhalides or alkoxyhalides, such as titanium tetrachloride ($TiCl_4$), vanadium tetrachloride ($VCl_4$) and vanadium oxytrichloride ($VOCl_3$), and titanium and vanadium alkoxides, wherein the alkoxide moiety has a branched or unbranched alkyl group of 1 to 20 carbon atoms, preferably 1 to 6 carbon atoms. Mixtures of such transition metal compounds also may be used. The amount of non-metallocene transition metal compound used is sufficient to give a transition metal to magnesium mol/mol ratio of from 0.3 to 1.5, or from 0.5 to 0.8. The diluent can then be removed in a conventional manner, such as by evaporation or filtering, to obtain the dry, supported nonmetallocene catalyst component.

According to another embodiment of the present invention, an increased amount of non-metallocene transition metal compound may be used in embodiments wherein the nonmetallocene catalyst component is combined with a metallocene catalyst component that has an increased concentration of a metallocene catalyst compound (e.g., the metallocene catalyst compound comprises a metal atom "M", and the ratio of aluminum (from an activator compound) to metal atom "M" is in the range of from 50:1 to 80:1, and from 60:1 to 70:1 in preferred embodiments). In such embodiments, the inclusion in the nonmetallocene catalyst component of an elevated concentration of non-metallocene transition metal compound (e.g., such that the molar ratio of non-metallocene transition metal compound to metallocene metal atom "M" is in the range of from 1:10 to 10:1, and in certain preferred embodiments from 1:1 to 10:1, and in certain more preferred embodiments from 3:1 to 7:1) may provide a more balanced catalyst system.

The nonmetallocene and metallocene catalyst components may be contacted with the support in any order. In a particular embodiment of the invention, the nonmetallocene catalyst component is reacted first with the support as described above, followed by contacting this supported nonmetallocene catalyst component with a metallocene catalyst component.

Metallocene Catalyst Component

In certain embodiments of the present invention wherein a bimodal catalyst system is used that comprises a bimetallic catalyst, the bimodal catalyst system includes a metallocene catalyst component as described herein. Metallocene catalyst compounds are generally described throughout in, for example, 1 & 2 METALLOCENE-BASED POLYOLEFINS (John Scheirs & W. Kaminsky eds., John Wiley & Sons, Ltd. 2000); G. G. Hlalky in 181 COORDINATION CHEM. REV. 243-296 (1999) and in particular, for use in the synthesis of polyethylene in 1 METALLOCENE-BASED POLYOLEFINS 261-377 (2000). The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components". The metallocene catalyst component is supported on a support material in a particular embodiment as described further below, and may be supported with or without the nonmetallocene catalyst component, with the nonmetallocene catalyst component in a particular embodiment.

The Cp ligands are typically π-bonded and/or fused ring(s) or ring systems. The ring(s) or ring system(s) typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Even more particularly, the Cp ligand(s) may be selected from the group consisting of substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4Ind$"), substituted versions thereof, and heterocyclic versions thereof. In a particular embodiment, the metallocenes useful in the present invention may be selected from those including one or two (two, in a more particular embodiment), of the same or different Cp rings selected from the group consisting of cyclopentadienyl, indenyl, fluorenyl, tetrahydroindenyl, and substituted versions thereof.

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 3 through 10 atoms in a more particular embodiment, and selected from the group consisting of Sc, Ti, Zr, Hf, V, Nb, Ta, Mn, Re, Fe, Ru, Os, Co, Rh, Ir, and Ni in yet a more particular embodiment; and selected from the group consisting of Groups 4, 5 and 6 atoms in yet a more particular embodiment, and from Ti, Zr, Hf atoms in yet a more particular embodiment, and may be Zr in yet a more particular embodiment. The oxidation state of the metal atom "M" may range from 0 to +7 in one embodiment; and in a more particular embodiment, is +1, +2, +3, +4 or +5; and in yet a more particular embodiment is +2, +3 or +4. The groups bound to the metal atom "M" are such that the compounds described below in the formulas and structures are electrically neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

In one aspect of the invention, the one or more metallocene catalyst components of the invention are represented by the formula (I):

$$Cp^A Cp^B MX_n \qquad (I)$$

wherein M is as described above; each X is chemically bonded to M; each Cp group is chemically bonded to M; and n is an integer from 0 to 4, and either 1 or 2 in a particular embodiment.

The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by a group R. In one embodiment, $Cp^A$ and $Cp^B$ are independently selected from the group consisting of the group consisting of cyclopentadienyl, indenyl, tetrahydroindenyl, fluorenyl, and substituted derivatives of each.

Independently, each $Cp^A$ and $Cp^B$ of formula (I) may be unsubstituted or substituted with any one or combination of substituent groups R. Non-limiting examples of substituent groups R as used in formula (I) as well as ring substituents in formulas (Va-d) include groups selected from the group consisting of hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof.

More particular non-limiting examples of alkyl substituents R associated with formula (I) through (V) include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as, but not limited to, olefinically-unsaturated substituents including vinyl-terminated ligands, for example 3-butenyl, 2-propenyl, 5-hexenyl and the like. In one embodiment, at least two R groups (two adjacent R groups in one embodiment) are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Non-limiting examples of X groups include alkyls, amines, phosphines, ethers, carboxylates, dienes, hydrocarbon radicals having from 1 to 20 carbon atoms; fluorinated hydrocarbon radicals (e.g., —$C_6F_5$ (pentafluorophenyl)), fluorinated alkylcarboxylates (e.g., $CF_3C(O)O$—), hydrides and halogen ions and combinations thereof. Other examples of X ligands include alkyl groups such as cyclobutyl, cyclohexyl, methyl, heptyl, tolyl, trifluoromethyl, tetramethylene, pentamethylene, methylidene, methoxy, ethyoxy, propoxy, phenoxy, bis (N-methylanilide), dimethylamide, dimethylphosphide radicals and the like. In one embodiment, two or more X's form a part of a fused ring or ring system.

In another aspect of the invention, the metallocene catalyst component includes those of formula (I) where CpA and CpB are bridged to each other by at least one bridging group, (A), such that the structure is represented by formula (II):

$$Cp^A(A)Cp^B MX_n \qquad (II)$$

These bridged compounds represented by formula (II) are known as "bridged metallocenes". $Cp^A$, $Cp^B$, M, X and n in formula (II) are as defined above for formula (I); and wherein each Cp ligand is chemically bonded to M, and (A) is chemically bonded to each Cp. Non-limiting examples of bridging group (A) include divalent hydrocarbon groups containing at least one Group 13 to 16 atom, such as, but not limited to, at least one of a carbon, oxygen, nitrogen, silicon, aluminum, boron, germanium and tin atom and combinations thereof; wherein the heteroatom also may be $C_1$ to $C_{12}$ alkyl or aryl substituted to satisfy neutral valency. The bridging group (A) also may contain substituent groups R as defined above (for formula (I)) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, —$Si(R')_2Si(R'_2)$—, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another embodiment, bridging group (A) also may be cyclic, comprising, for example 4 to 10 ring members (5 to 7 ring members in a more particular embodiment). The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O (in particular, Si and Ge). The bonding arrangement between the ring and the Cp groups may be either cis-, trans-, or a combination.

The cyclic bridging groups (A) may be saturated or unsaturated and/or may carry one or more substituents and/or may be fused to one or more other ring structures. If present, the one or more substituents are selected from the group consisting of hydrocarbyl (e.g., alkyl such as methyl) and halogen (e.g., F, Cl) in one embodiment. The one or more Cp groups to which the above cyclic bridging moieties may optionally be fused may be saturated or unsaturated, and may be selected from the group consisting of those having 4 to 10 (more particularly 5, 6 or 7) ring members (selected from the group consisting of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formulae (I) and (II) are different from each other in one embodiment, and the same in another embodiment.

In yet another aspect of the invention, the metallocene catalyst components include bridged mono-ligand metallocene compounds (e.g., mono cyclopentadienyl catalyst components). In this embodiment, the at least one metal locene catalyst component is a bridged "half-sandwich" metallocene represented by the formula (III):

wherein $Cp^A$ is defined above and is bound to M; (A) is a bridging group bonded to Q and $Cp^A$; and wherein an atom from the Q group is bonded to M; and n is an integer 0, 1 or 2. In formula (III) above, $Cp^A$, (A) and Q may form a fused ring system. The X groups and n of formula (III) are as defined above in formula (I) and (II). In one embodiment, $Cp^A$ is selected from the group consisting of cyclopentadienyl, indenyl, tetrahydroindenyl, fluorenyl, substituted versions thereof, and combinations thereof.

In formula (III), Q is a heteroatom-containing ligand in which the bonding atom (the atom that is bonded with the metal M) is selected from the group consisting of Group 15 atoms and Group 16 atoms in one embodiment, and selected from the group consisting of nitrogen, phosphorus, oxygen or sulfur atom in a more particular embodiment, and nitrogen and oxygen in yet a more particular embodiment. Non-limiting examples of Q groups include alkylamines, arylamines, mercapto compounds, ethoxy compounds, carboxylates (e.g., pivalate), carbamates, azenyl, azulene, pentalene, phosphoyl, phosphinimine, pyrrolyl, pyrozolyl, carbazolyl, borabenzene, and other compounds comprising Group 15 and Group 16 atoms capable of bonding with M.

In yet another aspect of the invention, the at least one metallocene catalyst component may be an unbridged "half sandwich" metallocene represented by the formula (IVa):

wherein $Cp^A$ is defined as for the Cp groups in (I) and is a ligand that is bonded to M; each Q is independently bonded to M; X is a leaving group as described above in (I); n ranges from 0 to 3, and is 0 or 3 in one embodiment; q ranges from 0 to 3, and is 0 or 3 in one embodiment. In one embodiment, $Cp^A$ is selected from the group consisting of cyclopentadienyl, indenyl, tetrahydroindenyl, fluorenyl, substituted version thereof, and combinations thereof.

In formula (IVa), Q is selected from the group consisting of ROO—, RO—, R(O)—, —NR—, —$CR_2$—, —S—, —$NR_2$, —$CR_3$, —SR, —$SiR_3$, —$PR_2$, —H, and substituted and unsubstituted aryl groups, wherein R is selected from the group consisting of $C_1$ to $C_6$ alkyls, $C_6$ to $C_{12}$ aryls, $C_1$ to $C_6$ alkylamines, $C_6$ to $C_{12}$ alkylarylamines, $C_1$ to $C_6$ alkoxys, $C_6$ to $C_{12}$ aryloxys, and the like. Non-limiting examples of Q include $C_1$ to $C_{12}$ carbamates, $C_1$ to $C_{12}$ carboxylates (e.g., pivalate), $C_2$ to $C_{20}$ alkyls, and $C_2$ to $C_{20}$ heteroallyl moieties.

Described another way, the "half sandwich" metallocenes above can be described as in formula (IVb), such as described in, for example, U.S. Pat. No. 6,069,213:

wherein:

M, $Cp^A$, X and n are as defined above;

$Q_2GZ$ forms a polydentate ligand unit (e.g., pivalate), wherein at least one of the Q groups form a bond with M, and is defined such that each Q is independently selected from the group consisting of —O—, —NR—, —$CR_2$— and —S—; G is either carbon or silicon; and Z is selected from the group consisting of R, —OR, —$NR_2$, —$CR_3$, —SR, —$SiR_3$, —$PR_2$, and hydride, providing that when Q is —NR—, then Z is selected from the group consisting of —OR, —$NR_2$, —SR, —$SiR_3$, —$PR_2$; and provided that neutral valency for Q is satisfied by Z; and wherein each R is independently selected from the group consisting of $C_1$ to $C_{10}$ heteroatom containing groups, $C_1$ to $C_{10}$ alkyls, $C_6$ to $C_{12}$ aryls, $C_6$ to $C_{12}$ alkylaryls, $C_1$ to $C_{10}$ alkoxys, and $C_6$ to $C_{12}$ aryloxys;

n is 1 or 2 in a particular embodiment; and

T is a bridging group selected from the group consisting of $C_1$ to $C_{10}$ alkylenes, $C_6$ to $C_{12}$ arylenes and $C_1$ to $C_{10}$ heteroatom containing groups, and $C_6$ to $C_{12}$ heterocyclic groups; wherein each T group bridges adjacent "$Cp^AM(Q_2GZ)X_n$" groups, and is chemically bonded to the $Cp^A$ groups.

m is an integer from 1 to 7; m is an integer from 2 to 6 in a more particular embodiment.

In another aspect of the invention, the at least one metallocene catalyst component can be described more particularly in formulae (Va), (Vb), (Vc) and (Vd):

(Va-i)

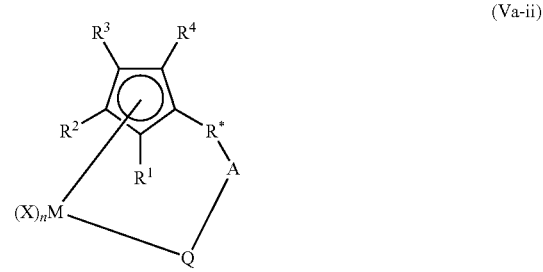

(Va-ii)

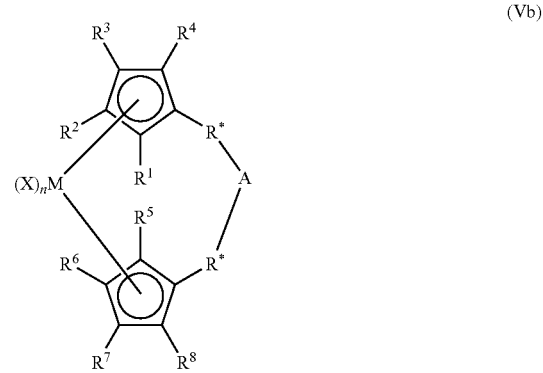

(Vb)

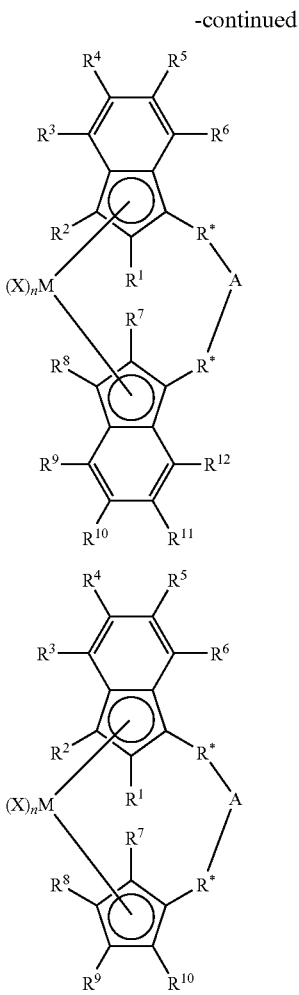

-continued (Vc)

(Vd)

wherein in formulae (Va) to (Vd) M is selected from the group consisting of Group 3 to Group 12 atoms, and selected from the group consisting of Group 3 to Group 10 atoms in a more particular embodiment, and selected from the group consisting of Group 3 to Group 6 atoms in yet a more particular embodiment, and selected from the group consisting of Group 4 atoms in yet a more particular embodiment, and selected from the group consisting of Zr and Hf in yet a more particular embodiment; and is Zr in yet a more particular embodiment;

wherein Q in (Va-i) and (Va-ii) is selected from the group consisting of halogen ions, alkyls, alkylenes, aryls, arylenes, alkoxys, aryloxys, amines, alkylamines, phosphines, alkylphosphines, substituted alkyls, substituted aryls, substituted alkoxys, substituted aryloxys, substituted amines, substituted alkylamines, substituted phosphines, substituted alkylphosphines, carbamates, heteroallyls, carboxylates (non-limiting examples of suitable carbamates and carboxylates include trimethylacetate, trimethylacetate, methylacetate, p-toluate, benzoate, diethylcarbamate, and dimethylcarbamate), fluorinated alkyls, fluorinated aryls, and fluorinated alkylcarboxylates;

q is an integer ranging from 1 to 3;

wherein each R* is independently: selected from the group consisting of hydrocarbyls and heteroatom-containing hydrocarbyls in one embodiment; and selected from the group consisting of alkylenes, substituted alkylenes and heteroatom-containing hydrocarbyls in another embodiment; and selected from the group consisting of $C_1$ to $C_{12}$ alkylenes, $C_1$ to $C_{12}$ substituted alkylenes, and $C_1$ to $C_{12}$ heteroatom-containing hydrocarbons in a more particular embodiment; and selected from the group consisting of $C_1$ to $C_4$ alkylenes in yet a more particular embodiment; and wherein both R* groups are identical in another embodiment in formulae (Vb-d);

A is as described above for (A) in formulae (II), and more particularly, selected from the group consisting of —O—, —S—, —SO$_2$—, —NR—, =SiR$_2$, =GeR$_2$, =SnR$_2$, —R$_2$SiSiR$_2$—, RP=, $C_1$ to $C_{12}$ alkylenes, substituted $C_1$ to $C_{12}$ alkylenes, divalent $C_4$ to $C_{12}$ cyclic hydrocarbons and substituted and unsubstituted aryl groups in one embodiment; and selected from the group consisting of $C_5$ to $C_8$ cyclic hydrocarbons, —CH$_2$CH$_2$—, =CR$_2$ and =SiR$_2$ in a more particular embodiment; wherein R is selected from the group consisting of alkyls, cycloalkyls, aryls, alkoxys, fluoroalkyls and heteroatom-containing hydrocarbons in one embodiment; and R is selected from the group consisting of $C_1$ to $C_6$ alkyls, substituted phenyls, phenyl, and $C_1$ to $C_6$ alkoxys in a more particular embodiment; and R is selected from the group consisting of methoxy, methyl, phenoxy, and phenyl in yet a more particular embodiment;

wherein A may be absent in yet another embodiment, in which case each R* is defined as for $R^1$-$R^{12}$;

each X is as described above in (I);

n is an integer from 0 to 4, and from 1 to 3 in another embodiment, and 1 or 2 in yet another embodiment; and $R^1$ through $R^{12}$ are independently: selected from the group consisting of hydrogen radical, halogen radicals, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in one embodiment; selected from the group consisting of hydrogen radical, fluorine radical, chlorine radical, bromine radical, $C_1$ to $C_6$ alkyls, $C_2$ to $C_6$ alkenyls, $C_7$ to $C_{18}$ alkylaryls, $C_1$ to $C_6$ fluoroalkyls, $C_2$ to $C_6$ fluoroalkenyls, $C_7$ to $C_{18}$ fluoroalkylaryls in a more particular embodiment; and hydrogen radical, fluorine radical, chlorine radical, methyl, ethyl, propyl, isopropyl, butyl, isobutyl, tertiary butyl, hexyl, phenyl, 2,6-di-methylphenyl, and 4-tertiarybutylphenyl groups in yet a more particular embodiment; wherein adjacent R groups may form a ring, either saturated, partially saturated, or completely saturated.

The structure of the metallocene catalyst component represented by (Va) may take on many forms such as disclosed in, for example, U.S. Pat. Nos. 5,703,187, and 5,747,406, including a dimer or oligomeric structure, such as disclosed in, for example, U.S. Pat. Nos. 5,026,798 and 6,069,213.

In a particular embodiment of the metallocene represented in (Vd), $R^1$ and $R^2$ form a conjugated 6-membered carbon ring system that may, or may not, be substituted.

Non-limiting examples of metallocene catalyst components consistent with the description herein include:
cyclopentadienylzirconium $X_n$,
indenylzirconium $X_n$,
(1-methylindenyl)zirconium $X_n$,
(2-methylindenyl)zirconium $X_n$,
(1-propylindenyl)zirconium $X_n$,
(2-propylindenyl)zirconium $X_n$,
(1-butylindenyl)zirconium $X_n$,
(2-butylindenyl)zirconium $X_n$,
(methylcyclopentadienyl)zirconium $X_n$,
tetrahydroindenylzirconium $X_n$, (pentamethylcyclopentadienyl)zirconium $X_n$,
cyclopentadienylzirconium $X_n$,
pentamethylcyclopentadienyltitanium $X_n$,
tetramethylcyclopentyltitanium $X_n$,
1,2,4-trimethylcyclopentadienylzirconium $X_n$,
dimethylsilyl(1,2,3,4-tetramethylcyclopentadienyl)(cyclopentadienyl)zirconium $X_n$,
dimethylsilyl(1,2,3,4-tetramethylcyclopentadienyl)(1,2,3-trimethyl-cyclopentadienyl)zirconium $X_n$,
dimethylsilyl(1,2,3,4-tetramethylcyclopentadienyl)(1,2-dimethyl-cyclopentadienyl)zirconium $X_n$,
dimethylsilyl(1,2,3,4-tetramethyl-cyclopentadienyl)(2-methylcyclopentadienyl)zirconium $X_n$,
dimethylsilyl(cyclopentadienyl)(indenyl)zirconium $X_n$,
dimethylsilyl(2-methylindenyl)(fluorenyl)zirconium $X_n$,
diphenylsilyl(1,2,3,4-tetramethyl-cyclopentadienyl)(3-propylcyclopentadienyl)zirconium $X_n$,
dimethylsilyl (1,2,3,4-tetramethylcyclopentadienyl) (3-t-butylcyclopentadienyl)zirconium $X_n$,
dimethylgermyl(1,2-dimethylcyclopentadienyl)(3-isopropylcyclopentadienyl)zirconium $X_n$,
dimethylsilyl(1,2,3,4-tetramethyl-cyclopentadienyl)(3-methylcyclopentadienyl)zirconium $X_n$,
diphenylmethylidene(cyclopentadienyl)(9-fluorenyl)zirconium $X_n$,
diphenylmethylidene(cyclopentadienyl)(indenyl)zirconium $X_n$,
iso-propylidenebis(cyclopentadienyl)zirconium $X_n$,
iso-propylidene(cyclopentadienyl)(9-fluorenyl)zirconium $X_n$,
iso-propylidene(3-methylcyclopentadienyl)(9-fluorenyl)zirconium $X_n$,
ethylenebis(9-fluorenyl)zirconium $X_n$,
meso-ethylenebis(1-indenyl)zirconium $X_n$,
ethylenebis(1-indenyl)zirconium $X_n$,
ethylenebis(2-methyl-1-indenyl)zirconium $X_n$,
ethylenebis(2-methyl-4,5,6,7-tetrahydro-1-indenyl)zirconium $X_n$,
ethylenebis(2-propyl-4,5,6,7-tetrahydro-1-indenyl)zirconium $X_n$,
ethylenebis(2-isopropyl-4,5,6,7-tetrahydro-1-indenyl)zirconium $X_n$,
ethylenebis(2-butyl-4,5,6,7-tetrahydro-1-indenyl)zirconium $X_n$,
ethylenebis(2-isobutyl-4,5,6,7-tetrahydro-1-indenyl)zirconium $X_n$,
dimethylsilyl(4,5,6,7-tetrahydro-1-indenyl)zirconium $X_n$,
diphenyl(4,5,6,7-tetrahydro-1-indenyl)zirconium $X_n$,
ethylenebis(4,5,6,7-tetrahydro-1-indenyl)zirconium $X_n$,
dimethylsilylbis(cyclopentadienyl)zirconium $X_n$,
dimethylsilylbis(9-fluorenyl)zirconium $X_n$,
dimethylsilylbis(1-indenyl)zirconium $X_n$,
dimethylsilylbis(2-methylindenyl)zirconium $X_n$,
dimethylsilylbis(2-propylindenyl)zirconium $X_n$,
dimethylsilylbis(2-butylindenyl)zirconium $X_n$,
diphenylsilylbis(2-methylindenyl)zirconium $X_n$,
diphenylsilylbis(2-propylindenyl)zirconium $X_n$,
diphenylsilylbis(2-butylindenyl)zirconium $X_n$,
dimethylgermylbis(2-methylindenyl)zirconium $X_n$,
dimethylsilylbis(tetrahydroindenyl)zirconium $X_n$,
dimethylsilylbis(tetramethylcyclopentadienyl)zirconium $X_n$,
dimethylsilyl(cyclopentadienyl)(9-fluorenyl)zirconium $X_n$,
diphenylsilyl(cyclopentadienyl)(9-fluorenyl)zirconium $X_n$,
diphenylsilylbis(indenyl)zirconium $X_n$,
cyclotrimethylenesilyl(tetramethylcyclopentadienyl)(cyclopentadienyl)zirconium $X_n$,
cyclotetramethylenesilyl(tetramethylcyclopentadienyl)(cyclopentadienyl)zirconium $X_n$,
cyclotrimethylenesilyl(tetramethylcyclopentadienyl)(2-methylindenyl)zirconium $X_n$,
cyclotrimethylenesilyl(tetramethylcyclopentadienyl)(3-methylcyclopentadienyl)zirconium $X_n$,
cyclotrimethylenesilylbis(2-methylindenyl)zirconium $X_n$,
cyclotrimethylenesilyl(tetramethylcyclopentadienyl)(2,3,5-trimethylcyclopentadienyl)zirconium $X_n$,
cyclotrimethylenesilylbis(tetramethylcyclopentadienyl)zirconium $X_n$,
dimethylsilyl(tetramethylcyclopentadienyl)(N-tert-butylamido)titanium $X_n$,
bis(cyclopentadienyl)chromium $X_n$,
bis(cyclopentadienyl)zirconium $X_n$,
bis(n-butylcyclopentadienyl)zirconium $X_n$,
bis(n-dodecylcyclopentadienyl)zirconium $X_n$,
bis(ethylcyclopentadienyl)zirconium $X_n$,
bis(iso-butylcyclopentadienyl)zirconium $X_n$,
bis(iso-propylcyclopentadienyl)zirconium $X_n$,
bis(methylcyclopentadienyl)zirconium $X_n$,
bis(n-oxtylcyclopentadienyl)zirconium $X_n$,
bis(n-pentylcyclopentadienyl)zirconium $X_n$,
bis(n-propylcyclopentadienyl)zirconium $X_n$,
bis(trimethylsilylcyclopentadienyl)zirconium $X_n$,
bis(1,3-bis(trimethylsilyl)cyclopentadienyl)zirconium $X_n$,
bis(1-ethyl-2-methylcyclopentadienyl)zirconium $X_n$,
bis(1-ethyl-3-methylcyclopentadienyl)zirconium $X_n$,
bis(pentamethylcyclopentadienyl)zirconium $X_n$,
bis(pentamethylcyclopentadienyl)zirconium $X_n$,
bis(1-propyl-3-methylcyclopentadienyl)zirconium $X_n$,
bis(1-n-butyl-3-methylcyclopentadienyl)zirconium $X_n$,
bis(1-isobutyl-3-methylcyclopentadienyl)zirconium $X_n$,
bis(1-propyl-3-butylcyclopentadienyl)zirconium $X_n$,
bis(1,3-n-butylcyclopentadienyl)zirconium $X_n$,
bis(4,7-dimethylindenyl)zirconium $X_n$,
bis(indenyl)zirconium $X_n$,
bis(2-methylindenyl)zirconium $X_n$,
cyclopentadienylindenylzirconium $X_n$,
bis(n-propylcyclopentadienyl)hafnium $X_n$,
bis(n-butylcyclopentadienyl)hafnium $X_n$,
bis(n-pentylcyclopentadienyl)hafnium $X_n$,
(n-propyl cyclopentadienyl)(n-butyl cyclopentadienyl) hafnium $X_n$,
bis[(2-trimethylsilylethyl)cyclopentadienyl]hafnium $X_n$,
bis(trimethylsilyl cyclopentadienyl)hafnium $X_n$,
bis(2-n-propylindenyl)hafnium $X_n$,
bis(2-n-butylindenyl)hafnium $X_n$,
dimethylsilylbis(n-propylcyclopentadienyl)hafnium $X_n$,
dimethylsilylbis(n-butylcyclopentadienyl)hafnium $X_n$,
bis(9-n-propylfluorenyl)hafnium $X_n$,
bis(9-n-butylfluorenyl)hafnium $X_n$,
(9-n-propylfluorenyl)(2-n-propylindenyl)hafnium $X_n$,
bis(1-n-propyl-2-methylcyclopentadienyl)hafnium $X_n$,
(n-propylcyclopentadienyl)(1-n-propyl-3-n-butylcyclopentadienyl)hafnium $X_n$,
dimethylsilyl(tetramethylcyclopentadienyl)(cyclopropylamido)titanium $X_n$,
dimethylsilyl(tetramethylcyclopentadienyl)(cyclobutylamido)titanium $X_n$,
dimethylsilyl(tetramethylcyclopentadienyl)(cyclopentylamido)titanium $X_n$,
dimethylsilyl(tetramethylcyclopentadienyl)(cyclohexylamido)titanium $X_n$,
dimethylsilyl(tetramethylcyclopentadienyl)(cycloheptylamido)titanium $X_n$, dimethylsilyl(tetramethylcyclopentadienyl)(cyclooctyla-
    mido)titanium $X_n$,
dimethylsilyl(tetramethylcyclopentadienyl)(cyclononyla-
    mido)titanium $X_n$,
dimethylsilyl(tetramethylcyclopentadienyl)(cyclodecyla-
    mido)titanium $X_n$,
dimethylsilyl(tetramethylcyclopentadienyl)(cycloundecyla-
    mido)titanium $X_n$,
dimethylsilyl(tetramethylcyclopentadienyl)(cyclododecyla-
    mido)titanium $X_n$,
dimethylsilyl(tetramethylcyclopentadienyl)(sec-butyla-
    mido)titanium $X_n$,
dimethylsilyl(tetramethylcyclopentadienyl)(n-octylamido)
    titanium $X_n$,
dimethylsilyl(tetramethylcyclopentadienyl)(n-decylamido)
    titanium $X_n$,
dimethylsilyl(tetramethylcyclopentadienyl)(n-octadecyla-
    mido)titanium $X_n$,
methylphenylsilyl(tetramethylcyclopentadienyl)(cyclopro-
    pylamido)titanium $X_n$,
methylphenylsilyl(tetramethylcyclopentadienyl)(cyclobuty-
    lamido)titanium $X_n$,
methylphenylsilyl(tetramethylcyclopentadienyl)(cyclopen-
    tylamido)titanium $X_n$,
methylphenylsilyl(tetramethylcyclopentadienyl)(cyclohexy-
    lamido)titanium $X_n$,
methylphenylsilyl(tetramethylcyclopentadienyl)(cyclohep-
    tylamido)titanium $X_n$,
methylphenylsilyl(tetramethylcyclopentadienyl)(cycloocty-
    lamido)titanium $X_n$,
methylphenylsilyl(tetramethylcyclopentadienyl)(cy-
    clononylamido)titanium $X_n$,
methylphenylsilyl(tetramethylcyclopentadienyl)(cyclodecy-
    lamido)titanium, $X_n$,
methylphenylsilyl(tetramethylcyclopentadienyl)(cyclounde-
    cylamido)titanium $X_n$,
methylphenylsilyl(tetramethylcyclopentadienyl)(cyclodode-
    cylamido)titanium $X_n$,
methylphenylsilyl(tetramethylcyclopentadienyl)(sec-butyla-
    mido)titanium $X_n$,
methylphenylsilyl(tetramethylcyclopentadienyl)(n-octyla-
    mido)titanium $X_n$,
methylphenylsilyl(tetramethylcyclopentadienyl)(n-decyla-
    mido)titanium $X_n$,
methylphenylsilyl(tetramethylcyclopentadienyl)(n-octade-
    cylamido)titanium $X_n$,
diphenylsilyl(tetramethylcyclopentadienyl)(cyclopropyla-
    mido)titanium $X_n$,
diphenylsilyl(tetramethylcyclopentadienyl)(cyclobutyla-
    mido)titanium $X_n$,
diphenylsilyl(tetramethylcyclopentadienyl)(cyclopentyla-
    mido)titanium $X_n$,
diphenylsilyl(tetramethylcyclopentadienyl)(cyclohexyla-
    mido)titanium $X_n$,
diphenylsilyl(tetramethylcyclopentadienyl)(cycloheptyla-
    mido)titanium $X_n$,
diphenylsilyl(tetramethylcyclopentadienyl)(cyclooctyla-
    mido)titanium $X_n$,
diphenylsilyl(tetramethylcyclopentadienyl)(cyclononyla-
    mido)titanium $X_n$,
diphenylsilyl(tetramethylcyclopentadienyl)(cyclodecyla-
    mido)titanium $X_n$,
diphenylsilyl(tetramethylcyclopentadienyl)(cycloundecyla-
    mido)titanium $X_n$,
diphenylsilyl(tetramethylcyclopentadienyl)(cyclododecyla-
    mido)titanium $X_n$,
diphenylsilyl(tetramethylcyclopentadienyl)(sec-butyla-
    mido)titanium $X_n$,
diphenylsilyl(tetramethylcyclopentadienyl)(n-octylamido)
    titanium $X_n$,
diphenylsilyl(tetramethylcyclopentadienyl)(n-decylamido)
    titanium $X_n$,
diphenylsilyl(tetramethylcyclopentadienyl)(n-octadecyla-
    mido)titanium $X_n$, and derivatives thereof, wherein the value of n is 1, 2 or 3. By "derivatives thereof", it is meant any substitution or ring formation as described above for formulae (Va-d) in one embodiment; and in particular, replacement of the metal "M" (Cr, Zr, Ti or Hf) with an atom selected from the group consisting of Cr, Zr, Hf and Ti; and replacement of the "X" group with any of $C_1$ to $C_5$ alkyls, $C_6$ aryls, $C_6$ to $C_{10}$ alkylaryls, fluorine, chlorine, or bromine.

It is contemplated that the metallocene catalyst components described above include their structural or optical or enantiomeric isomers (racemic mixture), and may be a pure enantiomer in one embodiment.

As used herein, a single, bridged, asymmetrically substituted metallocene catalyst component having a racemic and/or meso isomer does not, itself, constitute at least two different bridged, metallocene catalyst components.

The "metallocene catalyst component" useful in the present invention may comprise any combination of any "embodiment" described herein.

Accordingly, the supported, activated bimetallic catalysts of the present invention comprise an activator that comprises aluminum, and further comprise metallocene catalyst component that comprises a metal atom "M." The supported, activated bimetallic catalysts of the present invention may have a ratio of aluminum to metal atom "M" in the range of from 60:1 to 70:1, which is a higher ratio than that conventionally employed in the art. Quite unexpectedly, the use of such increased loading of metallocene catalyst component in the bimetallic catalyst systems of the present invention was found to increase catalyst activity without substantially adversely affecting the operability of the gas phase reactor or the properties (e.g., bulk density) of the polymer formed from the use of such bimetallic catalyst systems in olefin polymerization reactions.

When combined to form the bimetallic catalyst component, the molar ratio of metal from the nonmetallocene catalyst component to the metallocene catalyst component (e.g., molar ratio of Ti:Zr) is a value of from 1:10 to 10:1 in one embodiment; and from 1:1 to 10:1 in another embodiment, and from 3:1 to 7:1 in yet another embodiment; wherein a desirable molar ratio of nonmetallocene catalyst component metal:metallocene catalyst component metal is any combination of any upper limit with any lower limit described herein.

Activator

As used herein, the term "activator" is defined to be any compound or combination of compounds, supported or unsupported, which can activate a catalyst compound (e.g., Ziegler-Natta, metallocenes, Group 15-containing catalysts, etc.), such as by creating a cationic species from the catalyst component. Typically, this involves the abstraction of at least one leaving group (X group in the formulas above) from the metal center of the catalyst component. The catalyst components of the present invention are thus activated towards olefin polymerization using such activators. Embodiments of such activators include Lewis acids such as cyclic or oligomeric poly(hydrocarbylaluminum oxides), alkylaluminum compounds and so called non-coordinating ionic activators ("NCA") (alternately, "ionizing activators" or "stoichiometric activators"), or any other compound that can convert a neutral metallocene catalyst component to a metallocene cation that is active with respect to olefin polymerization.

More particularly, it is within the scope of this invention to use Lewis acids such as alumoxane (e.g., "MAO"), modified alumoxane (e.g., "TIBAO"), and alkylaluminum compounds as activators, and/or ionizing activators (neutral or ionic) such as tri (n-butyl)ammonium tetrakis(pentafluorophenyl)boron and/or a trisperfluorophenyl boron metalloid precursors to activate desirable metallocenes described herein. MAO and other aluminum-based activators are well known in the art. Ionizing activators are well known in the art. The activators may be associated with or bound to a support, either in association with the catalyst component (e.g., metallocene) or separate from the catalyst component, such as described by Gregory G. Hlalky, *Heterogeneous Single-Site Catalysts for Olefin Polymerization* 100(4) CHEMICAL REVIEWS 1347-1374 (2000).

Non-limiting examples of aluminum alkyl compounds that may be utilized as activators for the catalyst precursor compounds for use in the methods of the present invention include trimethylaluminum, triethylaluminum, triisobutylaluminum, tri-n-hexylaluminum, tri-n-octylaluminum and the like.

Examples of neutral ionizing activators include Group 13 tri-substituted compounds, in particular, tri-substituted boron, tellurium, aluminum, gallium and indium compounds, and mixtures thereof. The three substituent groups are each independently selected from the group consisting of alkyls, alkenyls, halogen, substituted alkyls, aryls, arylhalides, alkoxy and halides. In one embodiment, the three groups are independently selected from the group consisting of halogen, mono or multicyclic (including halosubstituted) aryls, alkyls, and alkenyl compounds and mixtures thereof. In another embodiment, the three groups are selected from the group consisting of alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls), and combinations thereof. In yet another embodiment, the three groups are selected from the group consisting of alkyls having 1 to 4 carbon groups, phenyl, naphthyl and mixtures thereof. In yet another embodiment, the three groups are selected from the group consisting of highly halogenated alkyls having 1 to 4 carbon groups, highly halogenated phenyls, and highly halogenated naphthyls and mixtures thereof. By "highly halogenated", it is meant that at least 50% of the hydrogens are replaced by a halogen group selected from the group consisting of fluorine, chlorine and bromine.

In another embodiment, the neutral tri-substituted Group 13 compounds are boron compounds. Other suitable neutral ionizing activators are described in U.S. Pat. No. 6,399,532 B1, U.S. Pat. No. 6,268,445 B1, and in 19 ORGANOMETALLICS 3332-3337 (2000), and in 17 ORGANOMETALLICS 3996-4003 (1998).

Illustrative, non-limiting examples of ionic ionizing activators include trialkyl-substituted ammonium salts such as triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl)ammonium tetra(o-tolyl)boron and the like; N,N-dialkyl anilinium salts such as N,N-dimethylanilinium tetra(phenyl)boron, N,N-diethylanilinium tetra(phenyl)boron, N,N-2,4,6-pentamethylanilinium tetra(phenyl)boron and the like; dialkyl ammonium salts such as di-(isopropyl)ammonium tetra(pentafluorophenyl)boron, dicyclohexylammonium tetra(phenyl)boron and the like; and triaryl phosphonium salts such as triphenylphosphonium tetra(phenyl)boron, tri(methylphenyl)phosphonium tetra(phenyl)boron, tri(dimethylphenyl)phosphonium tetra(phenyl)boron and the like, and their aluminum equivalents.

In yet another embodiment of the activator of the invention, an alkylaluminum can be used in conjunction with a heterocyclic compound. The ring of the heterocyclic compound may include at least one nitrogen, oxygen, and/or sulfur atom, and may include at least one nitrogen atom in one embodiment. The heterocyclic compound includes 4 or more ring members in one embodiment, and 5 or more ring members in another embodiment.

The heterocyclic compound for use as an activator with an alkylaluminum may be unsubstituted or substituted with one or a combination of substituent groups. Examples of suitable substituents include halogen, alkyl, alkenyl or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or any combination thereof. The substituent groups also may be substituted with halogens, particularly fluorine or bromine, or heteroatoms or the like.

Non-limiting examples of hydrocarbon substituents include methyl, ethyl, propyl, butyl, pentyl, hexyl, cyclopentyl, cyclohexyl, benzyl or phenyl groups and the like, including all their isomers, for example tertiary butyl, isopropyl, and the like. Other examples of substituents include fluoromethyl, fluoroethyl, difluoroethyl, iodopropyl, bromohexyl or chlorobenzyl.

In one embodiment, the heterocyclic compound is unsubstituted. In another embodiment one or more positions on the heterocyclic compound are substituted with a halogen atom or a halogen atom containing group, for example a halogenated aryl group. In one embodiment the halogen is selected from the group consisting of chlorine, bromine and fluorine.

Non-limiting examples of heterocyclic compounds utilized in the activator of the invention include substituted and unsubstituted pyrroles, imidazoles, pyrazoles, pyrrolines, pyrrolidines, purines, carbazoles, and indoles, phenyl indoles, 2,5-dimethylpyrroles, 3-pentafluorophenylpyrrole, 4,5,6,7-tetrafluoroindole or 3,4-difluoropyrroles.

In one embodiment, the heterocyclic compound described above is combined with an alkyl aluminum or an alumoxane to yield an activator compound which, upon reaction with a catalyst component (e.g., a metallocene), produces an active polymerization catalyst. Non-limiting examples of alkylaluminums include trimethylaluminum, triethylaluminum, triisobutylaluminum, tri-n-hexylaluminum, tri-n-octylaluminum, tri-iso-octylaluminum, triphenylaluminum, and combinations thereof.

Other activators include those described in WO 98/07515 such as tris (2,2',2"-nonafluorobiphenyl) fluoroaluminate. Combinations of activators also are contemplated by the invention, for example, alumoxanes and ionizing activators in combinations. Other activators include aluminum/boron complexes, perchlorates, periodates and iodates including their hydrates; lithium (2,2'-bisphenyl-ditrimethylsilicate) .4THF; silylium salts in combination with a non-coordinating compatible anion. Also, methods of activation such as using radiation, electro-chemical oxidation, and the like also are contemplated as activating methods for the purposes of rendering the neutral metallocene-type catalyst compound or precursor to a metallocene-type cation capable of polymerizing olefins. Other activators or methods for activating a metallocene-type catalyst compound are described in, for example, U.S. Pat. Nos. 5,849,852, 5,859,653 and 5,869,723 and WO 98/32775.

In general, the activator and catalyst component(s) are combined in mole ratios of activator to catalyst component from 1000:1 to 0.1:1 in one embodiment, and from 300:1 to 1:1 in a more particular embodiment, and from 150:1 to 1:1 in yet a more particular embodiment, and from 50:1 to 1:1 in yet a more particular embodiment, and from 10:1 to 0.5:1 in yet a more particular embodiment, and from 3:1 to 0.3:1 in yet a more particular embodiment, wherein a desirable range may include any combination of any upper mole ratio limit with any lower mole ratio limit described herein. When the activator is a cyclic or oligomeric poly(hydrocarbylaluminum oxide) (e.g., "MAO"), the mole ratio of activator to catalyst component ranges from 2:1 to 100,000:1 in one embodiment, and from 10:1 to 10,000:1 in another embodiment, and from 50:1 to 2,000:1 in a more particular embodiment. When the activator is a neutral or ionic ionizing activator such as a boron alkyl and the ionic salt of a boron alkyl, the mole ratio of activator to catalyst component ranges from 0.5:1 to 10:1 in one embodiment, and from 1:1 to 5:1 in yet a more particular embodiment.

More particularly, the molar ratio of Al/metallocene-metal (Al from MAO) ranges from 50 to 80 in one embodiment; and ranges from 55 to 80 in another embodiment; and ranges from 60 to 75 in yet another embodiment, and ranges from 60 to 70 in yet another embodiment; wherein a desirable molar ratio of Al(MAO) to metallocene-metal "M" can be any combination of any upper limit with any lower limit described herein.

Supports

The bimetallic catalyst system of the present invention further comprises a support material. Supports, methods of supporting, modifying, and activating supports for single-site catalyst such as metallocenes is discussed in, for example, 1 METALLOCENE-BASED POLYOLEFINS 173-218 (J. Scheirs & W. Kaminsky eds., John Wiley & Sons, Ltd. 2000). The terms "support" or "carrier", as used herein, are used interchangeably and refer to any support material, a porous support material in one embodiment, including inorganic or organic support materials. Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, thoria, aluminum phosphate gel, glass beads, and polymers such as polyvinylchloride and substituted polystyrene, functionalized or crosslinked organic supports such as polystyrene divinyl benzene polyolefins or polymeric compounds, and mixtures thereof, and graphite, in any of its various forms.

The support may be contacted with the other components of the catalyst system in any number of ways. In one embodiment, the support is contacted with the activator to form an association between the activator and support, or a "bound activator". In another embodiment, the catalyst component may be contacted with the support to form a "bound catalyst component". In yet another embodiment, the support may be contacted with the activator and catalyst component together, or with each partially in any order. The components may be contacted by any suitable means as in a solution, slurry, or solid form, or some combination thereof, and may be heated to any desirable temperature to effectuate a desirable chemical/physical transformation.

Desirable carriers are inorganic oxides that include Group 2, 3, 4, 5, 13 and 14 oxides and chlorides in one embodiment, and more particularly, inorganic oxides and chlorides of Group 13 and 14 atoms. Yet more particularly, support materials include silica, alumina, silica-alumina, magnesium chloride, graphite, and mixtures thereof. Other useful supports include magnesia, titania, zirconia, montmorillonite (EP 0 511 665 B1), phyllosilicate, and the like. Also, combinations of these support materials may be used, for example, silica-chromium, silica-alumina, silica-titania and the like. Additional support materials may include those porous acrylic polymers described in EP 0 767 184 B1.

In one aspect of the support useful in the invention, the support possesses a surface area in the range of from 10 to 700 $m^2/g$, pore volume in the range of from 0.1 to 4.0 $cm^3/g$ and average particle size in the range of from 5 to 500 µm. In another embodiment, the surface area of the carrier is in the range of from 50 to 500 $m^2/g$, pore volume of from 0.5 to 3.5 $cm^3/g$ and average particle size of from 10 to 200 µm. In yet another embodiment, the surface area of the carrier is in the range is from 100 to 400 $m^2/g$, pore volume from 0.8 to 3.0 $cm^3/g$ and average particle size is from 5 to 100 µm. The average pore size of the carrier of the invention typically has pore size in the range of from 10 to 1000 Å, from 50 to 500 Å in another embodiment, and from 75 to 350 Å in yet another embodiment.

In one embodiment of the support, graphite is used as the support. The graphite is a powder in one embodiment. In another embodiment, the graphite is flake graphite. In another embodiment, the graphite has a particle size of from 1 to 500 microns, from 1 to 400 microns in another embodiment, and from 1 to 200 in yet another embodiment, and from 1 to 100 microns in yet another embodiment.

Dehydration or calcining of the support also may be carried out. In one embodiment, the support is calcined prior to reaction with the fluorine or other support-modifying compound. In another embodiment, the support is calcined and used without further modification, or calcined, followed by contacting with one or more activators and/or catalyst components. Suitable calcining temperatures range from 100° C. to 1500° C. in one embodiment, and from 200° C. to 1200° C. in another embodiment, and from 300° C. to 1000° C. in another embodiment, and from 350° C. to 900° C. in yet another embodiment, and from 400° C. to 850° C. in yet a more particular embodiment, and from 800° C. to 900° C. in yet a more particular embodiment, and from 810° C. to 890° C. in yet a more particular embodiment, wherein a desirable range comprises any combination of any upper temperature limit with any lower temperature limit. Calcining may take place in the absence of oxygen and moisture by using, for example, an atmosphere of dry nitrogen. Calcining also may take place in the presence of dry air.

The support, especially an inorganic support or graphite support, may be pretreated such as by a halogenation process or other suitable process that, for example, associates a chemical species with the support either through chemical bonding, ionic interactions, or other physical or chemical interaction. It is within the scope of the present invention to co-contact (or "co-immobilize") more than one catalyst component with a support. Non-limiting examples of co-immobilization of catalyst components include two or more of the same or different metallocene catalyst components, one or more metallocene with a Ziegler-Natta type catalyst, one or more metallocene with a chromium or "Phillips" type catalyst, one or more metallocenes with a Group 15 containing catalyst, and any of these combinations with one or more activators. More particularly, co-supported combinations include metallocene A/metallocene A; metallocene A/metallocene B; metallocene/Ziegler Natta; metallocene/Group 15 containing catalyst; metallocene/chromium catalyst; metallocene/Ziegler Natta/Group 15-containing catalyst; metallocene/chromium catalyst/Group 15 containing catalyst, any of the these with an activator, and combinations thereof.

One embodiment of the support useful in the present invention is a so-called "enhanced support", prepared by heating support particles at a dehydration temperature of at least 800° C. or more, and between 800° C. and 1000° C. in another embodiment, resulting in an enhanced support having a modified chemical structure. In a particular embodiment, the heating of the support takes place in an inert (e.g., $N_2$ or Ar) atmosphere, and in the absence of water. In preferred embodiments, increased productivity is achieved when the enhanced support is combined with the other parts of the bimetallic catalyst discussed herein, to form a supported bimetallic catalyst, which is then contacted with monomers during polymerization to produce a bimodal polyolefin compositions.

In one or more specific embodiments, an enhanced support is first prepared, preferably in the manner described below; then that enhanced support is treated (e.g., combined with ingredients that form the first catalyst) to provide a supported catalyst that includes the nonmetallocene catalyst component. In specific embodiments, that supported first catalyst is then treated in the presence of the metallocene catalyst component to provide a supported bimetallic catalyst.

The enhanced support is prepared by any suitable means, and more particularly, by any means wherein water is removed from the support, such as by heating, exposure to low pressure, chemical treatment, or combinations thereof. Heating the support at a dehydration temperature of at least 800° C., and between 800° C. and 1000° C. in a particular embodiment, provides an enhanced support, for example, enhanced silica, which provides surprisingly improved results over a support that is dehydrated at lower temperatures (e.g., below 800° C., or even slightly lower temperatures, for example, 760° C.). While not immediately apparent from the enhancement procedure itself, it is contemplated that the heat treatment results in an actual chemical and/or physical change in the support structure itself, which only reveals its beneficial structure when combined with a first and metallocene catalyst components described herein, and placed in the context of an actual polymerization. For example, when the enhanced silica is combined with both the nonmetallocene catalyst component and the metallocene catalyst component to form a supported bimetallic catalyst composition, that supported bimetallic catalyst composition, including the enhanced silica, has been discovered as having desirably high productivity when used in a polymerization process for making bimodal polyolefin in a single reactor.

In a particular embodiment, the support useful in the present invention is a Group 13 or 14 inorganic oxide support having a pore volume ranging from 0.8 to 3 cm³/g and a surface area of from 100 to 500 m²/g. This support is desirably dehydrated as described herein in one embodiment. A preferred support is an amorphous high surface area silica, such as Davison 952 or Sylopol® 955, sold by Davison Chemical Division of W. R. Grace and Company. Those silicas are in spherical form, prepared by the spray drying process, with a surface area of 300 m²/g and a pore volume of 1.65 cm³/g. A procedure for dehydrating the silica at 600° C. is set forth in U.S. Pat. No. 5,525,678.

The enhanced support is then combined with a non-polar hydrocarbon diluent to form a support slurry, which can be stirred and optionally heated during mixing.

A variety of non-polar hydrocarbon diluents can be used to form the support slurry, but any non-polar hydrocarbon selected should remain in liquid form at all relevant reaction temperatures, and the ingredients used to form the nonmetallocene catalyst component should be at least partially soluble in the non-polar hydrocarbon. Accordingly, the non-polar hydrocarbon diluent is considered to be a "solvent" herein, even though in certain embodiments the ingredients are only partially soluble in the hydrocarbon.

Examples of suitable non-polar hydrocarbons include $C_4$-$C_{10}$ linear or branched alkanes, cycloalkanes and aromatics. More specifically, a non-polar alkane can be isopentane, hexane, isohexane, n-heptane, octane, nonane, or decane; a non-polar cycloalkane such as cyclohexane; or an aromatic such as benzene, toluene, or ethylbenzene. Mixtures of different non-polar hydrocarbons can also be used.

The support slurry can be heated both during and after mixing of the support particles with the non-polar hydrocarbon solvent, but at the point when either or both of the catalysts are combined with the support slurry, the temperature of the slurry should be sufficiently low so that neither of the catalysts are inadvertently deactivated. Thus, the temperature of the support slurry (e.g., silica slurry) is preferably maintained at a temperature below 90° C., for example, from 25 to 70° C., or from 40 to 60° C. in another embodiment.

Gas Phase Polymerization Process

The improved catalyst systems described herein are used to make polyolefin compositions. In certain embodiments of the present invention that use supported bimetallic catalyst compositions, these catalyst compositions may be used to make bimodal polyolefin compositions, e.g., compositions having a bimodal molecular weight distribution; in a particular embodiment, the bimetallic catalysts described herein are used in a single polymerization reactor to make the bimodal polyolefin composition. Once the supported bimetallic catalyst composition is prepared, as described above, a variety of processes can be carried out using that composition. Among the varying approaches that can be used include procedures set forth in U.S. Pat. No. 5,525,678 in which those processes are modified in accordance with the inventions claimed herein. The equipment, process conditions, reactants, additives and other materials of course will vary in a given process, depending on the desired composition and properties of the polymer being formed.

More particularly, the process of the present invention is directed toward a gas phase polymerization process of one or more olefin monomers having from 2 to 30 carbon atoms, from 2 to 12 carbon atoms in a more particular embodiment, and from 2 to 8 carbon atoms in yet a more particular embodiment. The invention is particularly well suited to the polymerization of two or more olefin monomers of ethylene, propylene, 1-butene, 1-pentene, 1-hexene, 1-heptene, 1-octene, 1-nonene, 4-methyl-1-pentene, 1-isobutene, 1-isobutene and 1-decene.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In a preferred embodiment of the process of the present invention, a copolymer of ethylene is produced, where with ethylene, a comonomer (having at least one α-olefin having from 4 to 15 carbon atoms, from 4 to 12 carbon atoms in yet a more particular embodiment, and from 4 to 8 carbon atoms in yet a more particular embodiment), is polymerized in a gas phase process.

In another embodiment of the process of the invention, ethylene may be polymerized with at least two different comonomers, optionally one of which may be a diene, to form a terpolymer.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer.

The reactor pressure in a gas phase process may vary from 100 psig (690 kPa) to 500 psig (3448 kPa) in one embodiment, from 200 psig (1379 kPa) to 400 psig (2759 kPa) in a more particular embodiment, and from 250 psig (1724 kPa) to 350 psig (2414 kPa) in yet a more particular embodiment.

The reactor temperature in a gas phase process may vary from 30° C. to 120° C. in one embodiment, from 60° C. to 115° C. in a more particular embodiment, from 70° C. to 110° C. in yet a more particular embodiment, and from 70° C. to 95° C. in yet a more particular embodiment, or as set out further below.

In an embodiment of the invention, the process is operated by introducing a carboxylate metal salt such as aluminum stearate or other metal-fatty acid compound into the reactor and/or contacting a carboxylate metal salt with the catalyst system of the invention prior to its introduction into the reactor.

The "catalyst system" useful in the gas phase polymerization process of the invention includes the unimodal catalyst systems described above, as well as the bimodal catalyst systems described above. In certain embodiments of the present invention wherein a bimodal catalyst system comprising a bimetallic catalyst is used, the bimetallic catalyst is activated by any suitable means known in the art, either before introduction into the polymerization reactor or in situ. The supported bimetallic catalyst is fed to the reactor in a dry (no diluent) state in a particular embodiment. In another embodiment, the bimetallic catalyst is suspended in a diluent (e.g., $C_5$ to $C_{15}$ hydrocarbon) comprising from 5 wt % to 100 wt % mineral oil or silicon oil and fed into the reactor.

The gas-phase process of the present invention includes contacting the catalyst system (including catalyst components and activators, and optionally, a support) with monomers in a reactor vessel of desirable configuration to form a polyolefin. In one embodiment, the contacting may take place in a first reactor vessel, followed by transfer of the formed polymer into another second, third etc. reactor vessel to allow further polymerization, optionally by adding the same or different monomers and optionally by adding the same or different catalyst components, activators, etc. In a particular embodiment of the present invention, the bimetallic catalyst system is contacted with monomers in a single reactor vessel (or "reactor"), followed by isolation of a finished polyolefin resin.

The mole ratio of hydrogen to ethylene has an upper limit of 0.015 in one embodiment, and an upper limit of 0.01 in another embodiment, 0.009 in yet another embodiment, and 0.008 in a more particular embodiment, and 0.007 in yet a more particular embodiment, and 0.006 in yet a more particular embodiment, and 0.005 in yet a more particular embodiment, and 0.004 in yet a more particular embodiment. Thus, for example, the average ratio of hydrogen to ethylene over a four-hour period is 0.009 or below during a continuous gas phase polymerization cycle, in one embodiment. The ratio of hydrogen to ethylene may have a lower limit of 0.0005 in another embodiment, and 0.001 in a more particular embodiment, and 0.002 in yet a more particular embodiment, and 0.003 in yet a more particular embodiment, and 0.004 in yet a more particular embodiment, and 0.005 in yet a more particular embodiment. The range of hydrogen levels (molar ratios of $H_2/C_2$) may comprise any combination of any upper ratio limit with any lower ratio limit described herein. For example, in a specific embodiment, the molar ratio of the hydrogen gas in the gaseous stream to ethylene in the gaseous stream may be from 0.003 to 0.009.

An alkylaluminum compound, or mixture of compounds, such as trimethylaluminum or triethylaluminum may be fed into the reactor in one embodiment at a rate of from 10 wt. ppm to 500 wt. ppm (weight parts per million alkylaluminum feed rate compared to ethylene feed rate), and from 50 wt. ppm to 400 wt. ppm in a more particular embodiment, and from 60 wt. ppm to 300 wt. ppm in yet a more particular embodiment, and from 80 wt. ppm to 250 wt. ppm in yet a more particular embodiment, and from 75 wt. ppm to 150 wt. ppm in yet another embodiment, wherein a desirable range may comprise any combination of any upper limit with any lower limit. The alkylaluminum can be represented by the general formula $AlR_3$, wherein each R is the same or different and independently selected from $C_1$ to $C_{10}$ alkyls and alkoxys.

Also, water also may be fed into the reactor in another embodiment at a rate of from 0.01 wt. ppm to 200 wt. ppm (weight parts per million water feed rate compared to ethylene feed rate), and from 0.1 wt. ppm to 150 wt. ppm in another embodiment, and from 0.5 wt. ppm to 100 wt. ppm in yet another embodiment, and from 1 wt. ppm to 60 wt. ppm in yet another embodiment, and from 5 wt. ppm to 40 wt. ppm in yet a more particular embodiment, wherein a desirable range may comprise any combination of any upper limit with any lower limit described herein.

Bimodal Polymer Product and Films Made Therefrom

The polymers produced by the processes described herein, utilizing the bimetallic catalysts described herein, which are preferably bimodal, can be used in a wide variety of products and end-use applications such as films, pipes and tubing, wire coating, and other applications. The polymers produced by the process of the invention include linear low density polyethylene, elastomers, plastomers, high density polyethylenes, medium density polyethylenes, and low density polyethylenes.

Polymers that can be made using the described processes can have a variety of compositions, characteristics and properties. At least one of the advantages of the bimetallic catalysts is that the process utilized can be tailored to form a polymer composition with a desired set of properties. For example, it is contemplated that polymers having the same properties as the bimodal polymer compositions in U.S. Pat. No. 5,525,678 can be formed.

The polymers, typically ethylene-based polymers, have a density in the range of from 0.860 g/cm³ to 0.970 g/cm³ in one embodiment, from 0.880 g/cm³ to 0.965 g/cm³ in a more particular embodiment, from 0.900 g/cm³ to 0.960 g/cm³ in yet a more particular embodiment, from 0.905 g/cm³ to 0.955 g/cm³ in yet a more particular embodiment, from 0.910 g/cm³ to 0.955 g/cm³ in yet a more particular embodiment, greater than 0.915 g/cm³ in yet a more particular embodiment, greater than 0.920 g/cm³ in yet a more particular embodiment, and greater than 0.925 g/cm³ in yet a more particular embodiment.

The polymers derived from the bimodal catalyst and process of the invention have a bulk density of from 0.400 to 0.900 g/cm³ in one embodiment, and from 0.420 to 0.800 g/cm³ in another embodiment, and from 0.430 to 0.500 g/cm³ in yet another embodiment, and from 0.440 to 0.60 g/cm³ in yet another embodiment, wherein a desirable range may comprise any upper bulk density limit with any lower bulk density limit described herein.

The polymers have a molecular weight distribution (e.g., a weight average molecular weight to number average molecular weight ($M_w/M_n$)) of from 5 to 80 in one embodiment, of from 10 to 60 in a more particular embodiment, of from 15 to 55 in yet a more particular embodiment, and of from 20 to 50 in yet a more particular embodiment.

The polymers made by the described processes have a melt index (MI) ($I_2$, as measured by ASTM D-1238, 190/2.16) in the range of from 0.01 dg/min to 100 dg/min in one embodiment, from 0.01 dg/min to 50 dg/min in a more particular embodiment, from 0.02 dg/min to 20 dg/min in yet a more particular embodiment, and from 0.03 dg/min to 2 dg/min in yet a more particular embodiment, and from 0.002 dg/min to 1 dg/min in yet a more particular embodiment, wherein a desirable range may comprise any combination of any upper I2 limit with any lower I2 limit.

Polymers made by the method of the invention have an HLMI ($I_{21}$, as measured by ASTM-D-1238, 190/21.6) value that ranges from 0.01 to 50 dg/min in one embodiment, and from 0.1 to 30 in another embodiment, and from 0.5 to 20 in yet a more particular embodiment, and from 1 to 10 in yet a more particular embodiment wherein a desirable range is any combination of any upper $I_{21}$ limit with any lower $I_{21}$ limit.

Polymers made by the described processes have a melt index ratio (MIR, or $I_{21}/I_2$) of from 20 to 500 in one embodiment, from 30 to 300 in a more particular embodiment, and from 60 to 200 in yet a more particular embodiment. Expressed differently, polymers made by the described processes have a melt index ratio of from greater than 40 in one embodiment, greater than 50 in a more particular embodiment, greater than 60 in yet a more particular embodiment, greater than 65 in yet a more particular embodiment, and greater than 70 in yet a more particular embodiment.

The bimodal polymers produced by certain embodiments of the present invention may have a certain average particle size, or APS (determined by using standard sieves), ranging from greater than 150 microns in one embodiment, and from 150 to 2000 microns in a more particular embodiment, and from 150 to 1000 microns in yet another embodiment, and from 300 to 800 microns in yet a more particular embodiment. Fines (e.g., particles having a size less than 125 µm) are typically present to less than 5 wt %, or less than 4 wt %, or less than 3 wt %.

The polymers of the invention may be blended and/or coextruded with any other polymer. Non-limiting examples of other polymers include linear low density polyethylenes produced via conventional Ziegler-Natta and/or metallocene-type catalysis, elastomers, plastomers, high pressure low density polyethylene, high density polyethylenes, and the like.

Polymers produced by the process of the invention and blends thereof are useful in such forming operations as film, sheet, pipe and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, cable and wire sheathing, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers and toys, etc.

More particularly, the polymers made by the method of the present invention are useful in making films. The films may be of any desirable thickness or composition, in one embodiment from 1 to 100 microns, and from 2 to 50 microns in a more particular embodiment, and from 10 to 30 microns in yet a more particular embodiment; and comprise copolymers of ethylene with a $C_3$ to $C_{10}$ olefin in one embodiment, ethylene with $C_3$ to $C_8$ α-olefins in a particular embodiment, and ethylene with $C_4$ to $C_6$ α-olefins in yet a more particular embodiment. The resins used to make the films may be blended with other additives such as pigments, antioxidants, fillers, etc, as is known in the art, as long as they do not interfere with the desired film properties.

To facilitate a better understanding of the present invention, the following examples of some exemplary embodiments are given. In no way should such examples be read to limit, or to define, the scope of the invention.

EXAMPLES

Example 1

In the following example, three samples of supported bimetallic catalysts were prepared. Specific properties of the samples are displayed in Table 1.

Preparation of Control Catalyst

A control catalyst was prepared as follows. A dehydrated silica was provided (Davison 955 silica, having an average particle size of about 40 microns, surface area of 300 m²/gram, and porosity of 1.5 cm³/gram. The silica was dried under nitrogen at 875° C. The dehydrated silica then was combined with a non-metallocene catalyst. About 538 grams of the dehydrated silica was added into a 6-liter, jacketed and agitated vessel that is kept under nitrogen pressure. Anhydrous hexane (1,565 grams) then was added into the vessel, making a silica/hexane slurry. The slurry was heated to a temperature of 54° C. while under constant stirring, and 244 grams of a 1 M solution of dibutyl magnesium in heptane was added to the slurry over a period of 30 minutes. The slurry then was mixed for an additional 60 minutes at 54° C. Butanol (29 grams) was diluted with 20 grams of hexane in a pint bottle under nitrogen atmosphere. The diluted butanol solution was added into the vessel containing the slurry over 15 minutes, and then the slurry was held at a temperature of 54° C. for 60 minutes while under constant agitation. Titanium tetrachloride (46.0 grams) was diluted with 20 grams of hexane in a pint bottle that is under a nitrogen atmosphere. The diluted titanium tetrachloride solution then was added into the vessel containing the slurry over 15 minutes. Following the addition of the solution, the slurry was allowed to stand for 60 minutes at a temperature of 54° C. The slurry then was allowed to cool to ambient temperature to form the "ZN" supported catalyst.

The respective metallocene catalyst compound then was added to each sample from the above slurry. The metallocene bis-n-butyl-cyclopentadienyl zirconium difluoride (12.5 grams) is first dissolved in anhydrous toluene in a half-gallon bottle under a nitrogen atmosphere. The 30 wt % methylaluminoxane (MAO)-in-toluene is then added to the bottle containing the dissolved metallocene compound. About 678 grams of solution are added, and mixed at room temperature for 2 hours. The MAO/Metallocene mixture was slowly added over a period of one hour into the vessel containing the previously-prepared titanium reaction slurry. Toluene (50 ml) was used to wash the residual MAO/Metallocene mixture remaining in the bottle into the vessel containing the reaction slurry. The resulting mixture that included the respective bimetallic catalyst sample then was held at ambient temperature for a period of one hour. Afterward, the slurry is dried to yield a free-flowing solid that is brown in color. The drying is performed at a jacket temperature of 73° C. with vacuum applied to reduce the vessel pressure to 180 mm Hg, with a nitrogen sweep used once the slurry has concentrated into a mud. The control catalyst then was used in a polymerization run in a gas phase reactor, under the conditions identified in Table 1 to form a polyethylene polymer composition.

Preparation of Catalyst Compositions of the Present Invention.

Two sample catalyst compositions of the present invention (Samples 2 and 3) then were prepared.

Sample 2 was prepared in the manner described above for the control catalyst, except that a 14 wt. % solution of dibutyl magnesium in heptane was used instead of a 1 molar solution, and the dibutylmagnesium-in-heptane solution was added to the slurry over a period of 63 minutes.

Sample 3 was prepared in the manner described above for the control catalyst, except that ES757 silica from Ineos was used, and was dehydrated at 875° C. in air. Moreover, a 14 wt. % solution of dibutyl magnesium in heptane was used instead of a 1 molar solution, and the dibutylmagnesium-in-heptane solution was added to the slurry over a period of 58 minutes. Additionally, the titanium tetrachloride addition differed in that the ratio of titanium tetrachloride to silica increased by 11%. Also, the addition of the metallocene bis-n-butyl-cyclopentadienyl zirconium difluoride differed in that the metallocene-to-silica ratio increased by 50%.

Fluid-Bed Polymerization. The polymerizations were conducted in a continuous gas phase fluidized bed reactor. The fluidized bed is made up of polymer granules. The gaseous feed streams of ethylene and hydrogen together with liquid comonomer were mixed together in a mixing tee arrangement and introduced into the recycle gas line upstream of the reactor bed. Monomers of 1-hexene were used as the comonomer. The individual flow rates of ethylene, hydrogen and comonomer were controlled to maintain fixed composition targets. The ethylene concentration was controlled to maintain a constant ethylene partial pressure. The hydrogen was controlled to maintain a constant hydrogen-to-ethylene mole ratio. Similarly, the 1-hexene flow rate to the reactor was controlled to maintain a constant 1-hexene-to-ethylene mole ratio. The concentration of all the gases were measured by an on-line gas chromatograph to ensure relatively constant composition in the recycle gas stream.

The solid catalyst was injected directly into the fluidized bed using purified nitrogen as a carrier. Trimethylaluminum (TMA) was injected into the fluidized bed as a cocatalyst for the ZN catalyst. Its rate was adjusted to maintain a constant TMA-to-ethylene mass flow ratio. The reacting bed of growing polymer particles is maintained in a fluidized state by the continuous flow of the make up feed and recycle gas through the reaction zone. A superficial gas velocity of 1-3 ft/sec was used to achieve this. The reactor was operated at a total pressure of about 300 psig. To maintain a constant reactor fluidized bed temperature, the temperature of the recycle gas is continuously adjusted up or down to accommodate any changes in the rate of heat generation due to the polymerization.

The fluidized bed was maintained at a constant height by withdrawing a portion of the bed at a rate equal to the rate of formation of particulate product. The product is removed semi-continuously via a series of valves into a fixed volume chamber. The reactor gas removed with the product during a discharge is vented to a flare, and not recycled back to the reactor. The product is purged to remove entrained hydrocarbons and treated with a small steam of humidified nitrogen to deactivate any trace quantities of residual catalyst and cocatalyst.

The catalyst activity may be calculated using titanium as a basis by dividing the titanium content of the catalyst by the residual titanium content found in the product. The titanium content of the product was determined using a calibrated x-ray fluorescene technique. Linear relations were used to correct catalyst activity for any differences in ethylene partial pressure and reactor residence time between polymerization runs.

Resin Properties. The properties of the polymer were determined by the following test methods:
1. Melt Index: ASTM D-1238-Condition E,
2. Density: ASTM D-105,
3. Bulk Density: The resin is poured via a ⅞ inch diameter funnel into a fixed volume cylinder of 400 cc. The bulk density is measured as the weight of resin divided by 400 cc to give a value in g/cc.

Each catalyst was evaluated in the fluidized bed reactor, wherein the residence time varied from about 3-4 hours, as indicated in Table 1. Each run was conducted using the same continuous gas phase fluidized bed reactor. The fluidized bed of that reactor was made up of polymer granules. During each run, the gaseous feed streams of ethylene and hydrogen were introduced upstream of the reactor bed into the recycle gas line. Hexene comonomer also was introduced into the recycle gas line upstream of the reactor bed. The individual flows of ethylene, hydrogen and hexene comonomer were controlled to maintain fixed composition targets, identified in Table 1. The concentrations of gases were measured by an on-line chromatograph.

Example 2

An additional set of experiments further illustrates, inter alia, the benefits that may be derived from the relatively slow addition of an organomagnesium compound (e.g., dibutylmagnesium) to a support slurry (e.g., a slurry comprising silica). Sample catalyst compositions were prepared as follows.

Sample catalyst composition 4 (a control catalyst compound) was prepared by placing 5 grams of Davison 955 silica (dehydrated at 875 C) into a 125 mL serum bottle inside a nitrogen dry box. Next, 40 mL of dry hexane was added onto the silica. The bottle was placed in a 55 C oil bath and stirred with a spin bar. Next, 3.80 grams of dibutylmagnesium (5.6 mL of 13.7 wt % dibutylmagnesium solution) was added to the silica slurry over one minute. Stirring continued for 1 hour at 55 C. About 3.7 mL of a 1 M solution of butanol in hexane was added, and stirring continued for 1 hour at 55 C. Next, 2.16 mL of a 1 M solution of $TiCl_4$ in hexane was added, and stirring continued for 1 hour at 55 C. Then, the mixture was dried under a nitrogen purge at 55 C for 2 hours.

Sample catalyst composition 5 (a catalyst composition of the present invention) was prepared in the manner described above for catalyst composition 4, except that the preparation of sample catalyst composition 5 involved slower addition of dibutylmagnesium to the silica slurry—the 3.80 grams of dibutylmagnesium (5.6 mL of 13.7 wt % dibutylmagnesium solution) was added to the silica slurry over 5 minutes.

Sample catalyst composition 6 (a control catalyst composition) was prepared in the manner described above for catalyst composition 4, except that the preparation of sample catalyst composition 6 was on a larger scale. In sample catalyst composition 6, the quantity of silica used was 500 grams. A five-liter three neck round bottom flask was used. The quantity of dry hexane used was 2,500 mL. The quantity of dibutylmagnesium (13.7 wt % solution in hexanes) used was 380.4 grams, and it was added to the silica slurry over 20 minutes. The quantity of butanol-in-hexane solution used was 27.4 mL butanol diluted to 120 mL with hexane. The quantity of $TiCl_4$-in-hexane solution used was 41.0 grams neat $TiCl_4$ diluted to 125 mL volume with hexanes. The titanium catalyst was dried at 54° C. under vacuum.

Sample catalyst composition 7 (a catalyst composition of the present invention) was prepared in the manner described above for catalyst composition 6, except that the preparation of sample catalyst composition 7 involved slower addition of dibutylmagnesium to the silica slurry—the 380.4 grams of 13.7 wt % dibutylmagnesium was added to the silica slurry over 3 hours minutes.

Ethylene polymerization runs were conducted in a 2.2 liter autoclave reactor. The reactor is predried at more than 100° C. under nitrogen purge for 30 minutes, then cooled to ambient temperature. Twenty milliliters of dried 1-hexene is added to the reactor. Via syringe, 0.5 mL of a 2.0 M solution of trimethylaluminum/hexanes is added to the reactor. Eight hundred milliliters of dry isobutane is added to the reactor as a diluent. Seventy six mmol of hydrogen is added afterward. The reactor is heated to 85° C. and diluent is stirred at 1,000 rpm. Fifty milligrams of catalyst is added to the reactor. The polymerization is run at 85° C. and 325 psig total pressure for 40 minutes. After the run, the ethylene supply is shut off, and the reactor is cooled to ambient temperature. The reactor contents are slowly vented off. The polymer is collected and dried, and the yield recorded. The yield of polyethylene produced from each run is summarized in Table 2 below.

The present invention offers many advantages over the prior art. One advantage is that the catalyst system offers improved catalyst productivity in polyethylene production. More particularly, the catalyst systems of the present invention have an activity of from greater than 6400 gram/gram-catalyst in one embodiment, and greater than 8400 gram/gram-catalyst in a more particular embodiment. This is a higher activity than for the corresponding control catalyst composition (Sample 1).

The catalyst and method of the present invention also offers the advantage of producing polyethylene polymers having bulk densities ranging from 0.350 to 0.500 g/ml in one embodiment, and ranging from 0.370 to 0.490 g/ml in another embodiment, and ranging from 0.390 to 0.480 g/ml in yet a more particular embodiment; and particularly when a silica support is used that has been dehydrated at from 830° C. or more in particular embodiments.

These results are accomplished using a molar ratio of hydrogen to ethylene as described herein, and more particularly of from 0.001 to 0.015 in one embodiment, and from 0.002 to 0.011 in another embodiment, and from 0.003 to 0.010 in yet another embodiment, and from 0.005 to 0.009 in yet another embodiment, wherein a desirable range may comprise any combination of any upper mole ratio limit with any lower mole ratio limit described herein.

TABLE 1

Reaction Conditions and Resin Properties

| Parameter | Sample 1 | Sample 2 | Sample 3 |
|---|---|---|---|
| Catalyst Description | Control | ZN/MN-difluoride | ZN/MN-difluoride |
| DBM addition (mmol Mg/gram $SiO_2$/min) | 0.036 | 0.0115 | 0.0123 |
| Ti loading (wt %) | 1.24 | 1.16 | 1.40 |
| Zr loading (wt %) | 0.34 | 0.36 | 0.50 |
| Reactor Residence Time (hrs) | 3.44 | 3.38 | 2.99 |
| $C_2$ Partial Pressure (psia) | 200.3 | 199.9 | 200.2 |
| $H_2/C_2$ feed mole ratio | 0.009 | 0.009 | 0.009 |
| $C_6/C_2$ feed mole ratio | 0.020 | 0.020 | 0.020 |
| Bed Temperature (° C.) | 95 | 95 | 95 |
| $TMA/C_2$ Flow Ratio (wt ppm) | 100.0 | 98.8 | 100.3 |
| $H_2O/C_2$ Flow Ratio (wt ppm) | 18.95 | 23.03 | 21.40 |
| Production Rate (lb/hr) | 33.2 | 34.1 | 38.2 |
| Corrected Catalyst Activity, Ti basis | 4876 | 6490 | 8386 |
| Resin Properties | | | |
| Density (g/cm³) | 0.9512 | 0.9514 | 0.9511 |
| Bulk Density (lb/ft³) | 24.67 | 24.63 | 23.85 |
| APS [inch] | 0.0363 | 0.0394 | 0.0449 |

TABLE 2

Catalyst Activity

| Parameter | Sample 4 | | Sample 5 | | Sample 6 | Sample 7 | |
|---|---|---|---|---|---|---|---|
| PE yield (g) | 85 | 80 | 111 | 106 | 100-110 typ. | 139 | 136 |

For the purpose of legal systems outside the United States in which preferred or optional features can be linked to or be dependent on multiple other features in the claims (such as under the European Patent Convention) specific embodiments are set forth as follows:

(1) A supported catalyst composition that is the product of a process comprising:

(a) providing a dehydrated support material;

(b) providing a support slurry by contacting the dehydrated support material with an organomagnesium compound at a rate such that no more than 0.024 mmole magnesium is contacted with each gram of dehydrated support material per minute;

(c) providing a nonmetallocene catalyst component that includes a non-metallocene catalyst;

(d) providing a metallocene catalyst component that includes a metallocene catalyst compound; and
(e) combining the support slurry with the first and metallocene catalyst components to form a supported bimetallic catalyst composition.

(2) The supported catalyst composition of claim 1, further comprising an activator that comprises aluminum, wherein the metallocene catalyst component comprises a metal atom "M," wherein the ratio of aluminum to metal atom "M" is in the range of from 50:1 to 80:1.

(3) The supported catalyst composition of either claim 1 or claim 2, wherein the nonmetallocene catalyst component is a Ziegler-Natta catalyst component that comprises a non-metallocene transition metal compound selected from the group consisting of Group 4 and Group 5 halides, oxides, oxyhalides, alkoxides, and mixtures thereof.

(4) A process for making polyolefins, comprising contacting monomers with the supported catalyst composition of any one or all of claims 1-3 for a time sufficient to form a bimodal polyolefin composition.

(5) A supported catalyst system that is the product of a process comprising
(a) providing a silica support material;
(b) providing a support slurry by contacting the silica support material with an organomagnesium compound at a rate such that no more than 0.024 mmole magnesium is contacted with each gram of support material per minute; and
(c) combining the support slurry with at least one titanium compound to provide a supported catalyst system.

(6) The supported catalyst system of claim 5 wherein the organomagnesium compound is dibutylmagnesium.

(7) The supported catalyst system of claim 5 or claim 6, wherein the at least one titanium compound has the formula $Ti(OR)_aX_b$, wherein R is selected from the group consisting of: a $C_1$ to $C_{14}$ aliphatic hydrocarbon radical, a $C_1$ to $C_{14}$ aromatic hydrocarbon radical, and COR' where R' is a $C_1$ to $C_{14}$ aliphatic or aromatic hydrocarbon radical; X is selected from the group consisting of Cl, Br, I and mixtures thereof; a is selected from the group consisting of 0, 1 and 2; b is 1 to 4 inclusive; and a+b=3 or 4.

(8) A process for making polyolefins, comprising contacting, in a reactor, ethylene and at least one comonomer selected from the group consisting of C3 to C8 alpha olefins in the presence of the supported catalyst system of any one or all of claims 5-7.

While the present invention has been described and illustrated by reference to particular embodiments, those of ordinary skill in the art will appreciate that the invention lends itself to many different variations not illustrated herein. For these reasons, then, reference should be made solely to the appended claims for purposes of determining the scope of the present invention. Further, certain features of the present invention are described in terms of a set of numerical upper limits and a set of numerical lower limits. It should be appreciated that ranges formed by any combination of these limits are within the scope of the invention unless otherwise indicated.

Unless otherwise indicated, all numbers expressing quantities of ingredients, properties, reaction conditions, and so forth, used in the specification and claims are to be understood as approximations based on the desired properties sought to be obtained by the present invention, and the error of measurement, etc., and should at least be construed in light of the number of reported significant digits and by applying ordinary rounding techniques. Notwithstanding that the numerical ranges and values setting forth the broad scope of the invention are approximations, the numerical values set forth are reported as precisely as possible.

What is claimed is:

1. A process for producing a bimodal polyolefin composition comprising:
   contacting hydrogen and ethylene monomers with a supported, activated bimetallic catalyst system to form a bimodal polyolefin composition; wherein the supported, activated bimetallic catalyst system comprises:
   (a) a support material, the support material contacted with an organomagnesium compound at a rate such that no more than 0.024 mmole magnesium is contacted with each gram of the support material per minute;
   (b) an activator that comprises aluminum;
   (c) a non-metallocene catalyst component; and
   (d) a metallocene catalyst component comprising a metal atom "M";
   wherein the molar ratio of aluminum to metal atom "M" is in the range of from 50:1 to 80:1.

2. The process of claim 1, wherein the non-metallocene catalyst component is a Ziegler-Natta catalyst component that comprises a non-metallocene transition metal compound selected from the group consisting of Group 4 and Group 5 halides, oxides, oxyhalides, alkoxides, and mixtures thereof.

3. The process of claim 2, wherein the molar ratio of non-metallocene transition metal compound to metal atom "M" is in the range of from 1:10 to 10:1.

4. The process of claim 1, wherein the metallocene catalyst component is represented by the formulae:

wherein each CpA and CpB are the same or different and are substituted or unsubstituted cyclopentadienyl rings or ligands isolobal to cyclopentadienyl, each bound to M; M is a Group 4, 5, or 6 atom; X is selected from the group consisting of C1 to C6 alkyls, C6 aryls, C7 to C12 alkylaryls, fluorinated C1 to C6 alkyls, fluorinated C6 aryls, fluorinated C7 to C12 alkylaryls, chlorine and fluorine; n is 1 or 2; and (A) is a divalent bridging group; characterized in that at least one X is a fluorine or fluorinated hydrocarbonyl.

5. The process of claim 1, wherein the support material is contacted with an organomagnesium compound at a rate such that no more than 0.012 mmole magnesium is contacted with each gram of the support material per minute.

6. A process of producing a bimodal polyolefin composition, comprising:
   (a) providing a dehydrated support material;
   (b) providing a support slurry by contacting the dehydrated support material with an organomagnesium compound at a rate such that no more than 0.024 mmole magnesium is contacted with each gram of dehydrated support material per minute;
   (c) providing a non-metallocene catalyst component that includes a non-metallocene catalyst compound;
   (d) providing a metallocene catalyst component that includes a metallocene catalyst compound;
   (e) combining the support slurry with the non-metallocene and metallocene catalyst components to form a supported bimetallic catalyst system; and
   (f) contacting monomers with the bimetallic catalyst system for a time sufficient to form a bimodal polyolefin composition;
wherein the metallocene catalyst component comprises an activator that comprises aluminum; wherein the metallocene catalyst compound comprises a metal atom "M," and wherein the molar ratio of aluminum to metal atom "M" is in the range of from 50:1 to 80:1.

7. The process of claim 6, wherein providing a support slurry comprises contacting the dehydrated support material with an organomagnesium compound at a rate such that no more than 0.012 mmole magnesium is contacted with each gram of dehydrated support material per minute.

* * * * *